(12) United States Patent
Rasheed et al.

(10) Patent No.: US 12,494,045 B2
(45) Date of Patent: Dec. 9, 2025

(54) COMPUTATIONALLY EFFICIENT DOCUMENT STAMP DETECTOR

(71) Applicant: KYOCERA Document Solutions, Inc., Osaka (JP)

(72) Inventors: Waqas Rasheed, Irvine, CA (US); Dongpei Su, Palos Verdes Estates, CA (US); Kilho Shin, Torrance, CA (US); Sheng Li, Irvine, CA (US)

(73) Assignee: KYOCERA Document Solutions, Inc., Osaka (JP)

( * ) Notice: Subject to any disclaimer, the term of this patent is extended or adjusted under 35 U.S.C. 154(b) by 462 days.

(21) Appl. No.: 18/055,782

(22) Filed: Nov. 15, 2022

(65) Prior Publication Data
US 2024/0161463 A1    May 16, 2024

(51) Int. Cl.
| | |
|---|---|
| *G06V 10/25* | (2022.01) |
| *G06V 10/74* | (2022.01) |
| *G06V 10/764* | (2022.01) |
| *G06V 10/77* | (2022.01) |
| *G06V 10/774* | (2022.01) |
| *G06V 10/82* | (2022.01) |
| *G06V 30/413* | (2022.01) |

(52) U.S. Cl.
CPC .......... *G06V 10/774* (2022.01); *G06V 10/761* (2022.01); *G06V 10/764* (2022.01); *G06V 10/7715* (2022.01); *G06V 10/82* (2022.01); *G06V 30/413* (2022.01)

(58) Field of Classification Search
CPC .. G06V 10/774; G06V 10/761; G06V 10/764; G06V 10/7715; G06V 10/82; G06V 30/413; G06V 10/25
See application file for complete search history.

(56) References Cited

U.S. PATENT DOCUMENTS

| | | | |
|---|---|---|---|
| 11,971,955 B1* | 4/2024 | Chakraborty | ....... G06F 3/04845 |
| 2010/0142832 A1 | 6/2010 | Nafarieh et al. | |
| 2019/0213408 A1 | 7/2019 | Cali et al. | |
| 2021/0297546 A1 | 9/2021 | Romero et al. | |
| 2022/0027676 A1 | 1/2022 | D'Ercoli et al. | |
| 2022/0051043 A1* | 2/2022 | Lee | ......... G06N 3/045 |
| 2022/0058496 A1* | 2/2022 | Rusk | ......... G06N 5/04 |
| 2023/0037923 A1 | 2/2023 | Desmet et al. | |
| 2023/0062072 A1 | 3/2023 | Walter et al. | |
| 2023/0124398 A1* | 4/2023 | Ampatzidis | .......... G06V 20/188 |
| | | | 382/110 |

(Continued)

FOREIGN PATENT DOCUMENTS

KR      102392036 B1    4/2022

OTHER PUBLICATIONS

U.S. Appl. No. 17/586,579, filed Jan. 27, 2022, Dongpei Su.

(Continued)

*Primary Examiner* — Michael Horabik
*Assistant Examiner* — Ahmed A Nasher
(74) *Attorney, Agent, or Firm* — Carnelian Law, LLC

(57) ABSTRACT

A digital image comparator includes an Faster R-CNN configured to generate a filtered set of local feature maps of an input image, a match head, and logic to preserve the local feature maps in an indexed data structure and to make the local feature maps retrievable by the match head via local feature map indexes.

6 Claims, 35 Drawing Sheets

(56) References Cited

U.S. PATENT DOCUMENTS

2023/0133690 A1* 5/2023 Gao .................. G06N 20/00
704/9
2023/0169786 A1* 6/2023 Yuan .................. G06V 30/412
382/156

OTHER PUBLICATIONS

Akash Thomas, Shippping Label reading from boxes using cv2 and deep learning (part 2), Feb. 21, 2020, pp. 1-14, Published in Beautiful ML medium.com.

Araujo, S.A., & Kim, H.Y . . . Ciratefi: An RST-Invariant Template Matching with Extension to Color Images. Integr. Comput. Aided Eng., 18, 75-90 (2011).

Badrinaathan J, Srinivas, LNB, International Journal of Pure and Applied Mathematics vol. 118 No. 5, 499-505 (2018).

Bo Li et al, High Performance Visual Tracking with Siamese Region Proposal Network, 2018, pp. 8971-8980, In Proceedings of the IEEE conference on computer vision and pattern recognition.

Chunsheng Liu et al., ACF Based Region Proposal Extraction for YOLOv3 Network Towards High-Performance Cyclist Detection in High Resolution Images, Jun. 13, 2019, pp. 1-18, School of Control Science and Engineering, Shandong University, Ji'nan 250061, China.

Elad Hoffer, Deep Metric Learning Using Triplet Network, Dec. 4, 2018, pp. 1-8, Department of Electrical Engineering, Department of Computer Science, Technion Israel Institute of Technology.

Eran Goldman et al, Precise Detection in Densely Packed Scenes, Apr. 30, 2019, pp. 1-10, Bar-Ilan University, Tel Aviv University, Trax Retail, The Open University of Israel.

Florian Schroff, FaceNet: A Unified Embedding for Face Recognition and Clustering, Jun. 17, 2015, Google Inc.

Gregory Koch, Siamese Neural Networks for One-shot Image Recognition, 2015, vol. 37, Proceedings of the 32nd International Conference on Machine Learning, Lille, France.

Lowe, D.G. Distinctive Image Features from Scale-Invariant Keypoints. International Journal of Computer Vision 60, 91-110 (2004).

Luca Bertinetto et al, Fully-convolutional siamese networks for object tracking, 2016, pp. 850-865, Springer International Publishing, Switzerland.

Miguel Pinto, Split overlapping bounding boxes in Python Complete tutorial in 5 steps from problem formulation up to creating a PyPI package, tested using data from Global Wheat Detection Kaggle competition, Jun. 11, 2020, pp. 1-9, Published in Towards Data Science.

Renu Khandelwal, One-Shot Learning With Siamese Network An intuitive explanation of Siamese Network, Jan. 27, 2021, pp. 1-8, Published in "The Startup" of medium.com.

Using Zonal OCR to Extract Data Fields From Scanned Documents, Published on docparser.com.

Xiao Ling, How to Detect and Decode QR Code with YOLO, OpenCV, and Dynamsoft Barcode Reader, Nov. 20, 2020, pp. 1-8, Published at Dynamsoft.com.

Ahmed, Sheraz, et al. "A generic method for stamp segmentation using part-based features." 2013 12th International Conference on Document Analysis and Recognition. IEEE, 2013. (Year: 2013) pp. 708-712.

Gharavi-Alkhansari, Mohammad. "A fast globally optimal algorithm for template matching using low-resolution pruning." IEEE Transactions on Image Processing 10.4 (2001): 526-533. (Year: 2001) pp. 526-533.

Li, Wei, and Zhilin Song. "Bank Card No. Identification Based on Template Matching Method." Cyberspace Safety and Security : 11th International Symposium, CSS 2019, Guangzhou, China, Dec. 1-3, 2019, Proceedings, Part II 11. Springer International Publishing, 2019. (Year: 2019) pp. 572-578.

Rosenfeld, Azriel. "Coarse-fine template matching." IEEE Transaction on Systems Man and Cybernetics 7.2 (1977): 104-107. (Year : 1977) pp. 104-107.

Z. Mohamadian and A A Pouyan, "Detection of Duplication Forgery in Digital Images in Uniform and Non-uniform Regions," 2013 UKSim 15th International Conference on Computer Modelling and Simulation, Cambridge, UK, 2013, pp. 455-460, doi: 10.1109/UKSim.2013.94. (Year: 2013).

Sawradip Saha; Utsab Saha; Swojan Datta Sammya; Shahed Ahmed; Shaikh Anowarul Fattah, "A Siamese Based One Shot Learning Network with a Watermark Enhancement Technique for Historical Watermark Recognition", Conference Date—Jul. 1-3, 2022; Date Added to IEEE Xplore—Aug. 29, 2022 (Year: 2022).

* cited by examiner

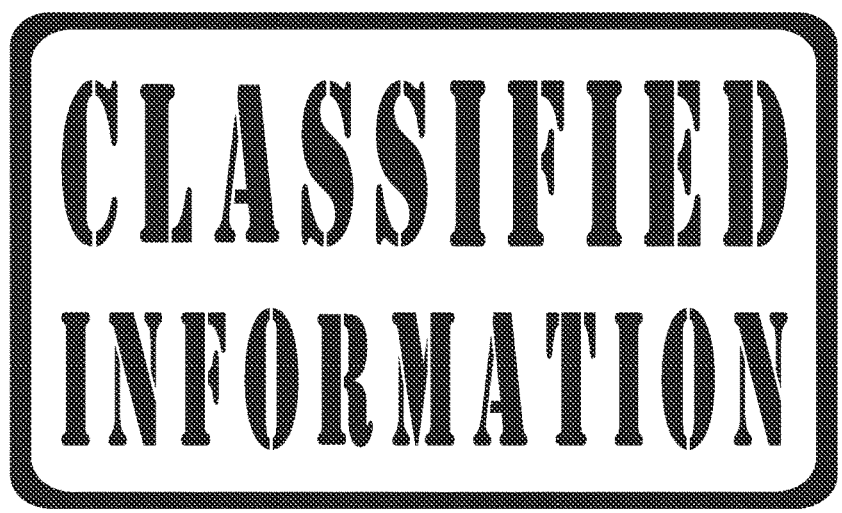
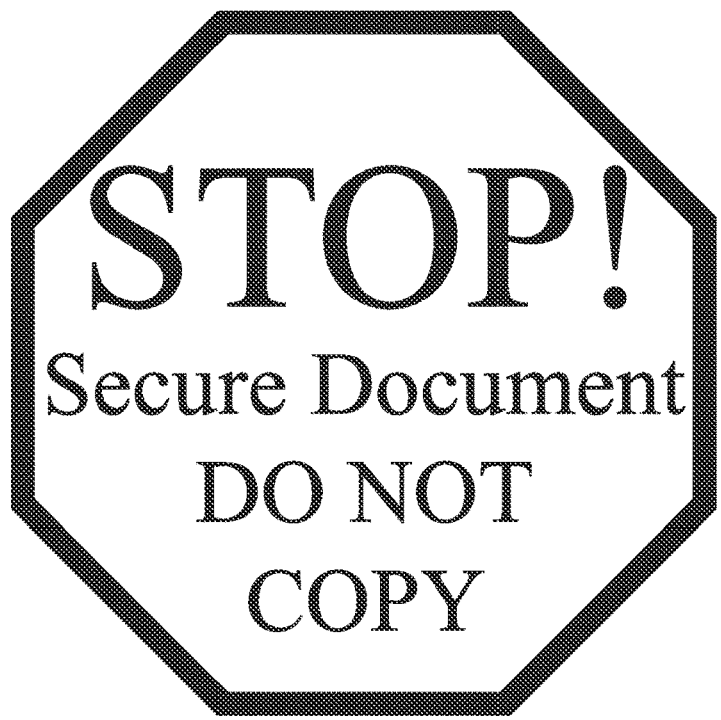
FIG. 8

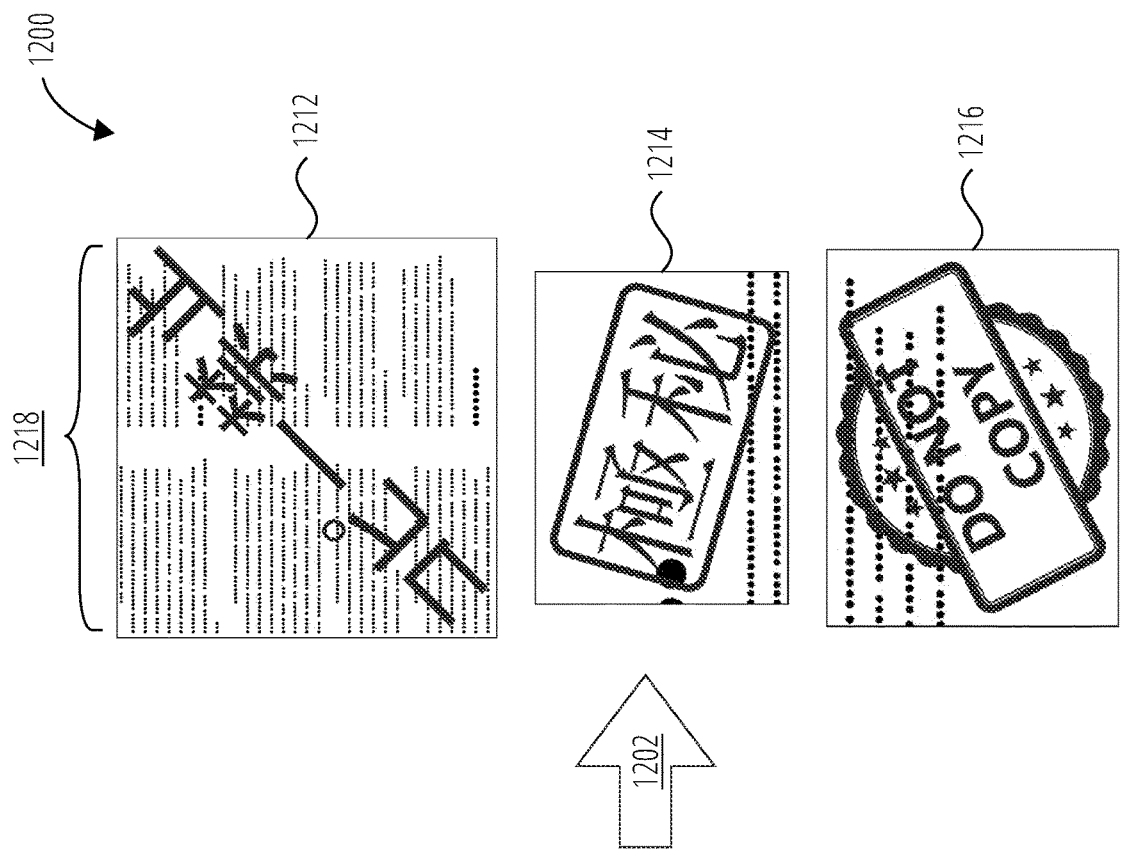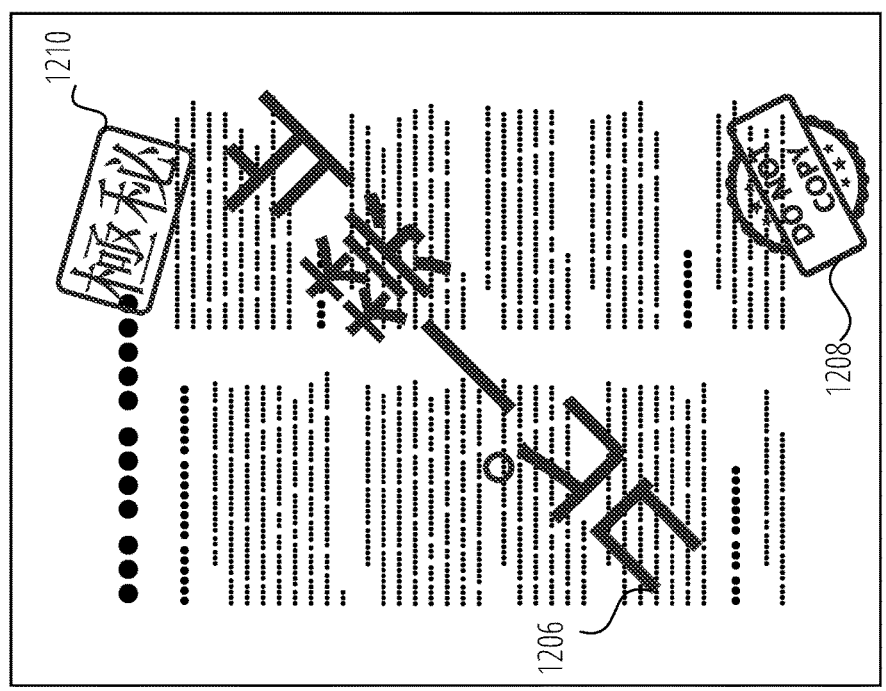
FIG. 12

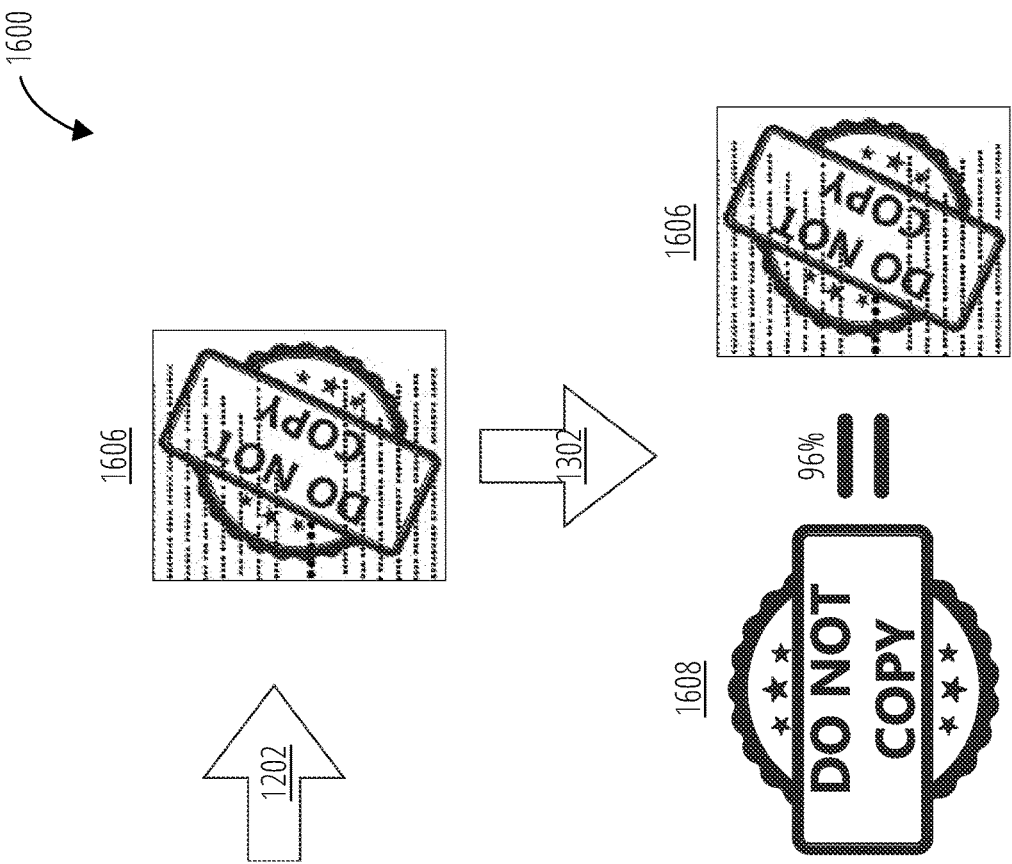
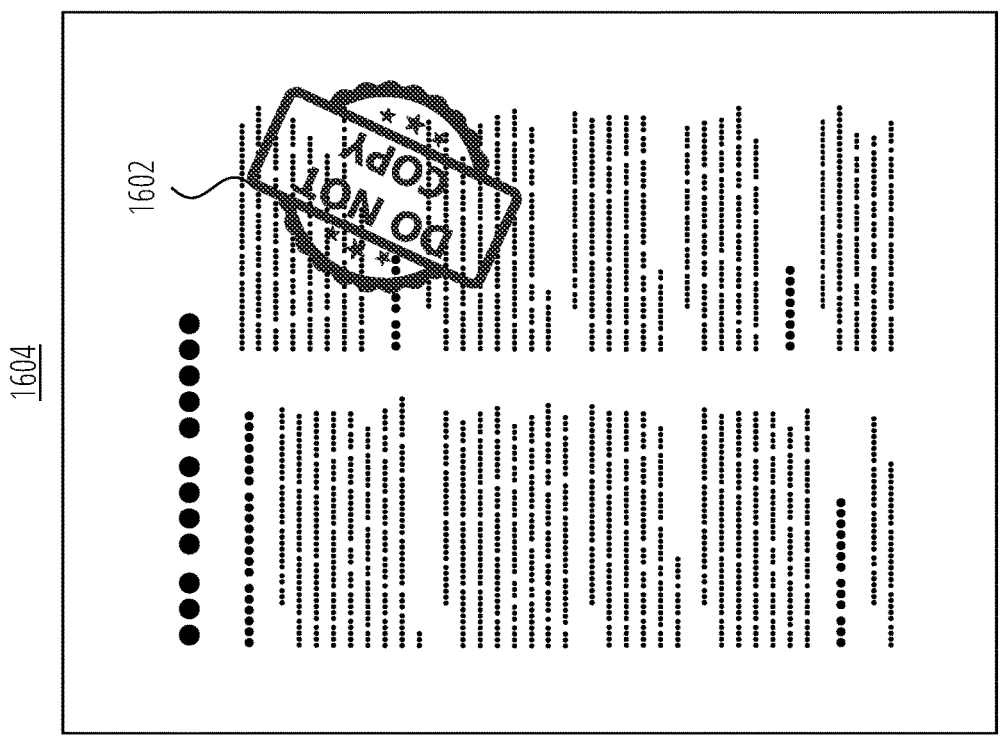
FIG. 16

COMPUTATIONALLY EFFICIENT DOCUMENT STAMP DETECTOR

BACKGROUND

The detection and recognition of stamps (seals) on digital images is an area of interest in the field of digital image processing. For example, stamps are often used as a copy-guard for security purposes. Once a security keyword stamp is detected, such as "CONFIDENTIAL", it may be desirable for a machine such as a copier to be able to detect such a stamp, and automatically take some action.

A variety of methods from the field of image processing, pattern recognition, and some heuristics are currently utilized for digital stamp detection and classification. The problem can be difficult for machines to implement, however, because the variation of the size, shape, font, and style of custom stamps is virtually limitless. To cope with custom stamps, template matching approaches are often utilized.

Template-based matching techniques are not scale or rotation invariant, may execute slowly at high resolution, and often utilize an artificial similarity threshold for detection judgment. The similarity score, however, is highly content-dependent and variable. There is no threshold that works universally for most images. Therefore, template-based matching is not suitable for a fully automated approach for general patterns.

Feature-based matching, such as 'Scale-Invariant Feature Transform' (SIFT), 'Sped Up Robust Features' (SURF), and 'Features from Accelerated Segment Test' (FAST), are mechanisms for logo detection that are not directly applicable to stamp detection because of different properties of the original pattern and a scanned-in version of the pattern against a document background. Human-designed geometrical features are heavily influenced by the process of imprinting (noise, inconsistency, gaps, stains, etc.) in the stamp representation. Because of this and the diversity of stamps, even within a single class (in terms of shape), a straightforward application of such descriptors is often impractical.

In recent years, Deep Neural Networks (DNN) have been used successfully for many computer vision tasks. However, conventional DNNs may rely on supervised learning and thus may need thousands of labeled images for adequate training. In stamp detection, however, the shape, design, and style attributes of stamps are limitless. The page content that stamps may be applied to is also of limitless variation. It may therefore be impractical to provide thousands of real-life documents for detector training.

As the technology transitions from paper documents to digital ones, there is, therefore, a need for a solution providing automatic segmentation and extraction of important document elements such as stamps, seals, and the like.

Document security control is a commonly implemented feature in document management systems. Digital documents may have password protection or encryption methods to protect them from unauthorized use. Physical documents, which need to be scanned of photocopied, necessitate different mechanisms to detect the content and prevent illegal copying.

One conventional approach to document security control involves imbuing prints and copies of documents with hidden patterns embedded in the background. When a page of such a document is then printed or copied, the embedded patterns become visible on the copies. When a scanner detects the masking pattern, the printed data may either be obscured by a gray box or the document author's name (for example), or a warning message may be included. Sometimes, copy restriction patterns are embedded on all printed sheets.

Another mechanism intends to prevent unauthorized copying by concealing keywords all over the background. These keywords are then brought to the foreground if detected during a copy operation. Alternately, copying may be restricted by embedding tracking information with a special code into documents. The code itself may contain the authentication and access information.

A hidden (not readily visible to humans) pattern may be embedded in each confidential page. When these pages are scanned by machines equipped to recognize and respond to the patterns, the special pattern may be detected and illegal duplication may be prevented. When the pages are scanned with devices which are not equipped with responsive technology, the hidden pattern embedded as tinted block may appear and warn the user.

A drawback of this approach is that it may waste toner through applying the security pattern to the entire page. Further, conventional mechanisms rely on having complete control of copy guard generation, which is a significant limitation.

Stamps and watermarks are commonly used security marks on printed (and digital) documents. Compared to existing features such as embedded micro-structures, quick response (QR) codes, and zonal optical character recognition (OCR), stamps and watermarks are natural, intuitive, and aligned with users' common security awareness and work flow. It has proven challenging to develop solutions that utilize common, visible, and natural copy guard patterns such as watermarks and stamps in automated copy guard solutions and security purposes.

There is, therefore, a need for a security solution deployable in printers, scanners, multifunction printers (MFPs), and similar technology, that detects stamps, watermarks, and other easily applied marks or patterns in pages of documents presented for scanning, copying, printing, etc. Any such solution should be robust with regard to detecting customer-specific patterns and marks used for copy guard security.

Conventional deep learning-based object detectors are subject to bounding box grouping and ungrouping errors when processing images comprising sparsely distributed and densely distributed objects, respectively.

When processing dense or crowded images that contain many objects, conventional object detectors may return multiple bounding boxes that appear identical in close proximity, or that overlap the same object with slightly different shapes and centers. This problem arises from errors of quantitatively and accurately determining the ending coordinates of one object and the beginning coordinates of the another, or sometimes just merging duplicate detections.

Images where this may occur often have one or more of the following characteristics:
- comprises multiple class representations as defined in the training set
- one object touches or overlaps with another object in a crowded space
- contains objects that represent as a collection of sub-objects learned by the deep learning model during training In sparse images, conventional deep learning algorithms may detect several groups of small objects each as a different instance, although they represent a single object, collectively. Images where this may occur often have one or more of the following characteristics:
- contain sparsely crowded colonies of pixels contain text-type disjoint sub-objects
may be segmented into instances of multiple objects learned by the deep learning model during training Addressing this sort of bounding box grouping problem usually involves determining a continuation of the sparsely distributed sub-objects in the image and grouping them together via some quantitative post-processing.

One conventional method for bounding box determination involves learning a Jaccard index with a soft Intersection over Union (Soft-IoU) network layer. An Expectation-Maximization (EM) based merger unit converts detections and Soft-IoU scores into a Mixture of Gaussian (MoG) to resolves the overlapping detections. This method accounts for a series of densely packed objects detected in a sequence like a series of books in a bookshelf, or a stack of grocery items in a superstore's aisle, but it does not address randomly occurring objects in the vicinity of one another, which are detected with different bounding boxes.

Another conventional method utilizes an aggregated channel feature (ACF) based region proposal method to generate candidate bounding boxes, and consequently merges and extends them into correct region proposals. This method combines similar class objects together in a single bounding box, but does not solve the problem of one object detected under multiple bounding boxes.

Yet another conventional method draws padding around the bounding boxes around sparsely distributed overlapping objects with a box shape distortion or truncation feature. This approach is limited due to the necessity to merge multiple bounding boxes to determine the true object boundary.

Yet another conventional method fuses meaningful bounding boxes according to a ratio of the distance between to words to the height of a word, where the value of this ratio (dx) is manually set to 1.2. This process does not address text orientation and the resultant boxes may not properly bound convex objects. This method may also result in inaccurately cropped text, which may not match the whole (or exact) word/phrase.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 8 depicts example copy-guard digital stamp patterns 800 in accordance with one embodiment.

FIG. 12 depicts a first stage 1200 in accordance with one embodiment.

FIG. 16 depicts a pattern localization and template matching applied to a scanned document 1600 in accordance with one embodiment.

DETAILED DESCRIPTION

Figure 1:
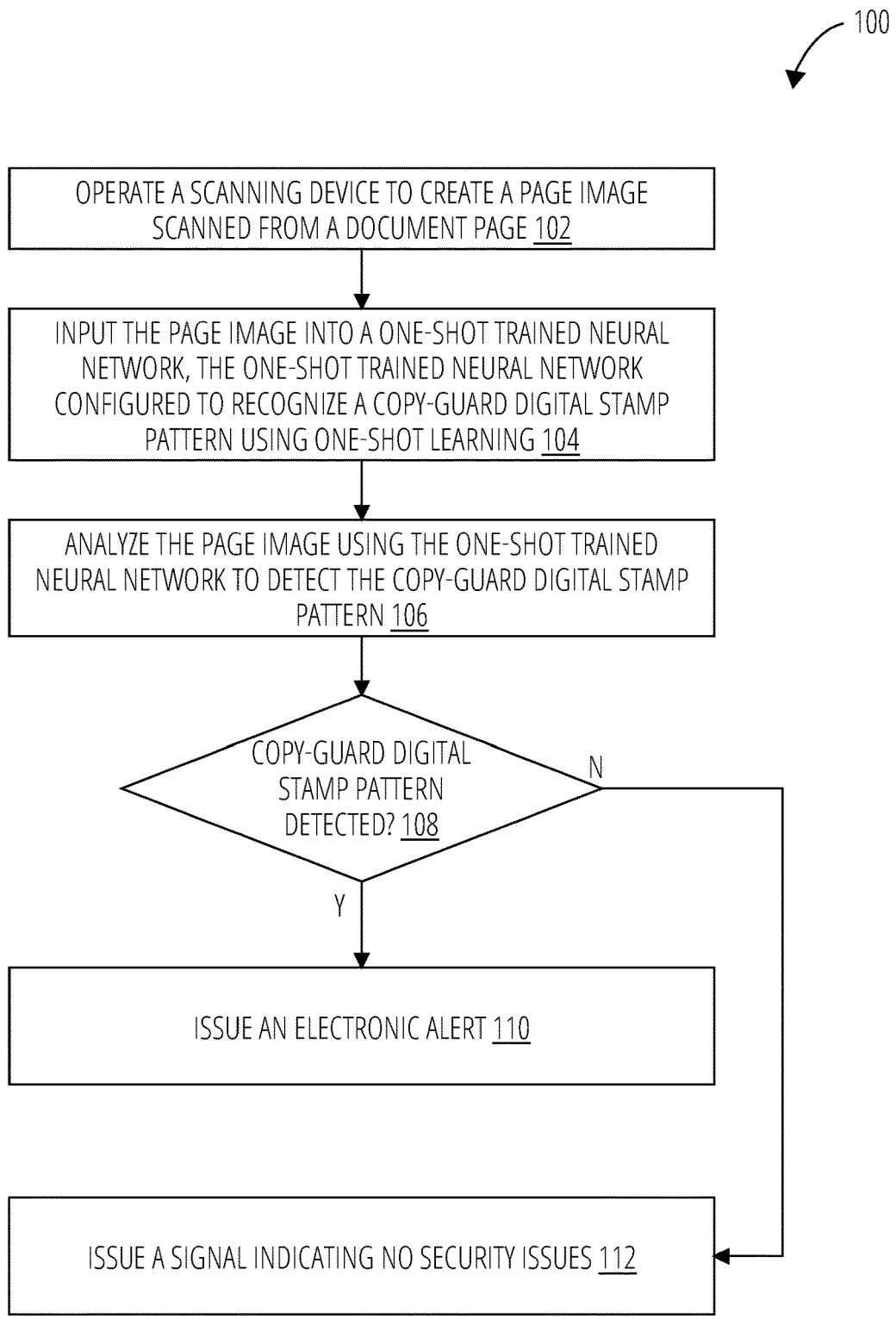
FIG. 1 depicts a routine to detect and respond to a copy-guard digital stamp pattern 100 in accordance with one embodiment.

The disclosed solution may implement a twin neural network to perform custom stamp recognition/matching. The twin neural network may learn the domain-specific embedding to match before-unseen stamp pairs without needing to train on or store hundreds of labeled images of a new custom stamp. The one-shot nature of this solution makes it suitable to detect and recognize new stamps without such training or comparison material.

In this disclosure, reference may be made to the following terms, technologies, and concepts:

1. Feature based pattern matching comprises four high-level steps: feature detection, feature extraction, feature matching, and computing affinity. Local image features, such as edges and interest points, provide rich information on the image content. Local features and their descriptors are the building blocks of many computer vision algorithms. Their applications include image registration, object detection and classification, tracking, and motion estimation. These features are exclusive to each image, and thus help in identifying similarities and differences between images. The features of an image may persist through changes in size and orientation, so this approach may further prove useful where the match in a scanned image is transformed in some fashion.
2. Template based pattern matching involves comparing a template (pattern) image against the query image by sliding (translating in the X or Y dimension) the template image a number of pixels (e.g., one pixel) at a time from left to right or from top to bottom to enable calculation of a numerical measure of similarity to the patch it overlaps. Both images may in some embodiments be converted into binary images, in black and white, or converted to edge images using an edge filter. Template matching techniques may be utilized such as cross-correlation, normalized cross-correlation, and sum of squared difference. After looping through a number of template sizes, a region with the largest correlation coefficient may be selected as a "matched" region.
3. "One-shot learning" in this disclosure refers to an object categorization problem, found mostly in computer vision. Whereas most machine learning based object categorization algorithms require training on hundreds or thousands of samples/images and very large datasets, one-shot learning aims to learn information about object categories from one, or only a few, training samples/images. Unlike traditional supervised learning, one-shot learning relies on the similarity between new object classes and the previously learned classes on which they were based. One-shot learning thus leverages global knowledge of the scene in which the object is placed to learn efficient representation of domain contextual information and apply this learned knowledge to "one-shot" inference task.
4. A 'twin neural network' herein refer to an artificial neural network that uses the same weights while working in tandem on two different input vectors to compute comparable output vectors. Often one of the output vectors is precomputed, thus forming a baseline against which the other output vector is compared. This may involve applying a distance function for locality-sensitive hashing. A twin neural network is sometimes referred to in the art as a Twin neural network.
5. An affine transformation is a transformation of a graphical element that preserves lines and parallelism, though not always distances or angles. Examples of affine transformations include translation, scaling, homothety, similarity, reflection, rotation, shear mapping, etc., as well as combinations of these affine transformations.
6. Masked alpha blending is a process of overlaying an image component that includes transparent components over a fully opaque image. The transparent components of the overlay image are fully transparent and all other components are fully opaque in masked alpha blending.
7. A user-registered security pattern is a pattern example provided to the system a priori of operating the system on a document for security control.

Mechanisms addressing the problems outlined above may utilize collections of web-scraped copy-guard digital stamp patterns and other digital stamp patterns. Office document pages may be collected as background page images. Each stamp pattern may be randomly affine transformed, may have noise added, then may be overlaid onto a randomly picked background page. In one embodiment, this may be accomplished by masked alpha blending. The synthesized images thus created may be grouped into image pairs. Pairs showing the same stamp may be labeled one way, e.g., as "1". Pairs showing different stamps and pairs where one or both images contain no stamp may be labeled another way, e.g., as "0". The synthesized "stamped" page images may be printed and then scanned to introduce real-life print and copy noise.

A twin neural network may then be applied to the synthesized page images for feature extraction. Networks similar to Alex-net may be used, for example. Other convolutional neural networks (CNNs) may also be employed. A loss function such as contrastive loss, which uses distance-based loss as opposed to more conventional error-prediction losses, may be operated to learn embeddings in which two similar points have a low Euclidean distance, and two dissimilar points have a large Euclidean distance.

A contrastive loss function such as the following may be implemented:

$$L = (1 = Y)\frac{1}{2}(D_w)^2 + (Y)\frac{1}{2}\{\max(0, m - D_w)\}^2$$

where L is the contrastive loss value, and $D_\omega$ is the Euclidean distance determined by:

$$\sqrt{\{G_\omega(X_1) - G_\omega(X_2)\}^2}$$

where $G_\omega$ is the output of the network for one image.

In a twin neural network, the weights are configured to be identical for both of the networks in. Therefore, in one embodiment, only a single network of the pair may be used and fed two images in succession. A loss value may be calculated on the results of processing both of the images through a single network, then backpropagated to update the weights of both networks. This process may be iterated for many epochs. Using one network instead of both for training may save memory and improve computational efficiency. Of course, in situations where these resources are not constrained, training may be performed by operating both networks in parallel on the pairs of images.

The model may be tested using pairs of images of the same stamps and different or no stamps to form a testing dataset. These image pairs may be passed through the networks, and the Euclidean distance may be determined between the images. This may be compared with a pre-set threshold, such as 0.5, to make a "same" or "different" determination. This determination may be checked against the image pair label (0 or 1, as previously described). Once trained and tested, the model may be deployed to the deployment target device. The model may first be mapped to layers that are supported by the target device. It may then be translated to a fixed-point model and recalibrated.

Embodiments of a custom stamp/watermark detector that detects a user-registered security pattern with high accuracy are disclosed, providing security in situations when personnel inadvertently or illicitly attempt a copying operation on stamped documents. These embodiments may utilize two-stage mechanisms that tolerate variations in size, angle, noise, location, tone, and other aspects of stamps and watermarks. A twin neural network may be operated to perform cross-matching of patterns on documents to registered security patterns. These mechanisms may detect relatively small patterns, and may operate accurately on custom user patterns when provided with a single sample to learn from.

The disclosed mechanisms may enable:
  registration of a custom security pattern template;
  reliable identification of security patterns of various types, such as:
    stamps
    watermarks
    security keywords
    customer specific patterns;
  detection of variations in the security pattern template such as:
    pattern size
    scanned document size
    document orientation
    rotation
    color or grayscale
    transparency
    location in the document
    language
  matching the detected security pattern with the registered security pattern or keyword
  preventing a user from scanning or printing a document if the registered security pattern or keyword exists in the document.

Embodiments of a region proposal network (RPN) are described that address deficiencies in conventional approaches. These embodiments may demonstrate improved object detection accuracy and reduced misdetection or partial detection of objects in images, scanned documents, and digital scenes and may perform well on corner cases that are generally missed or misrepresented by conventional mechanisms, on images, scanned documents, etc. that comprise dense and/or sparse textual objects.

Segmented detection of a textual object in particular may be accurately consolidated to avoid misrepresentation, or partial representation of textual objects. The bounding boxes generated by the RPN network are consolidated in order to detect textual objects, such as watermarks and stamps.

Figure 24:
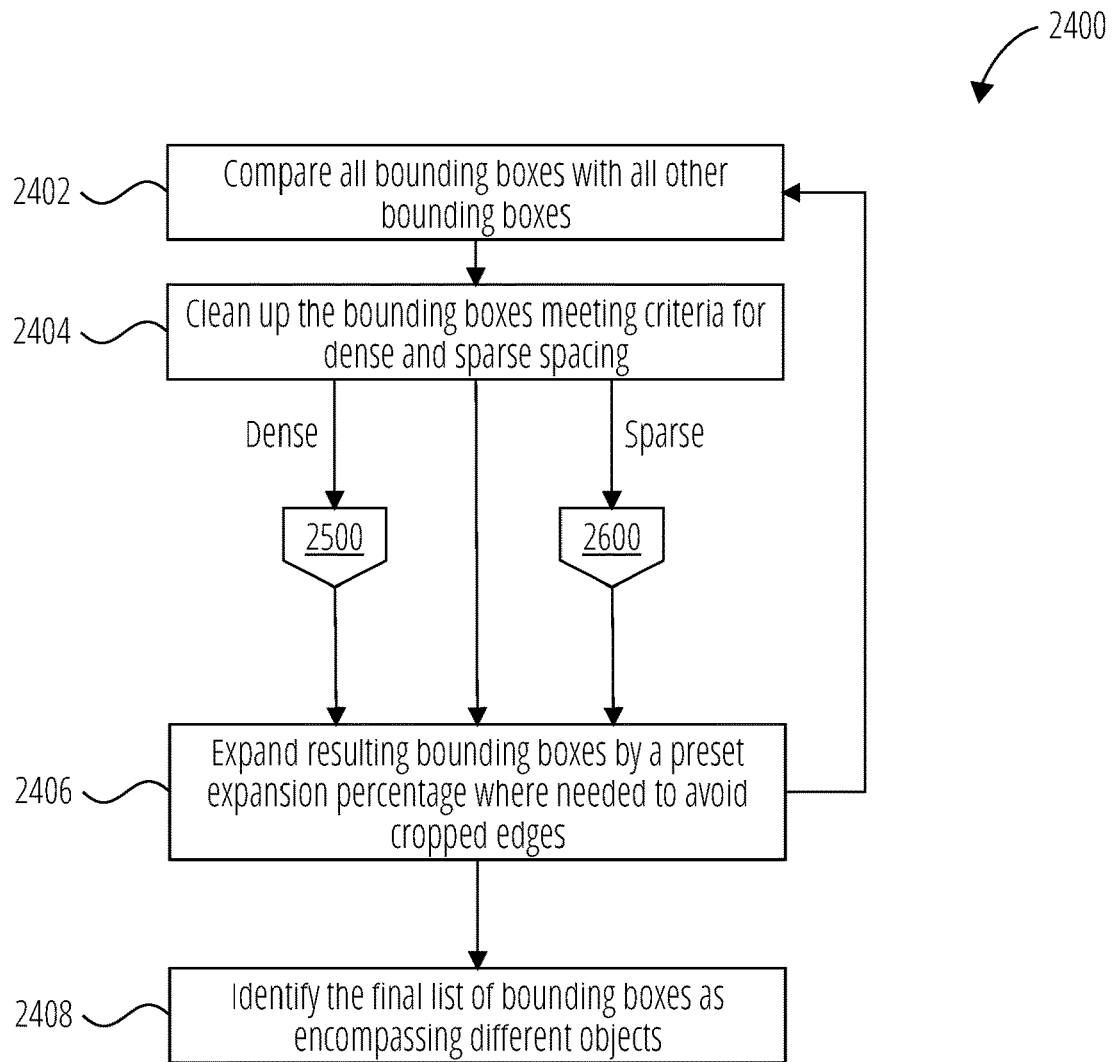
FIG. 24 depicts an algorithm for analyzing bounding boxes 2400 in accordance with one embodiment.
Figure 25:
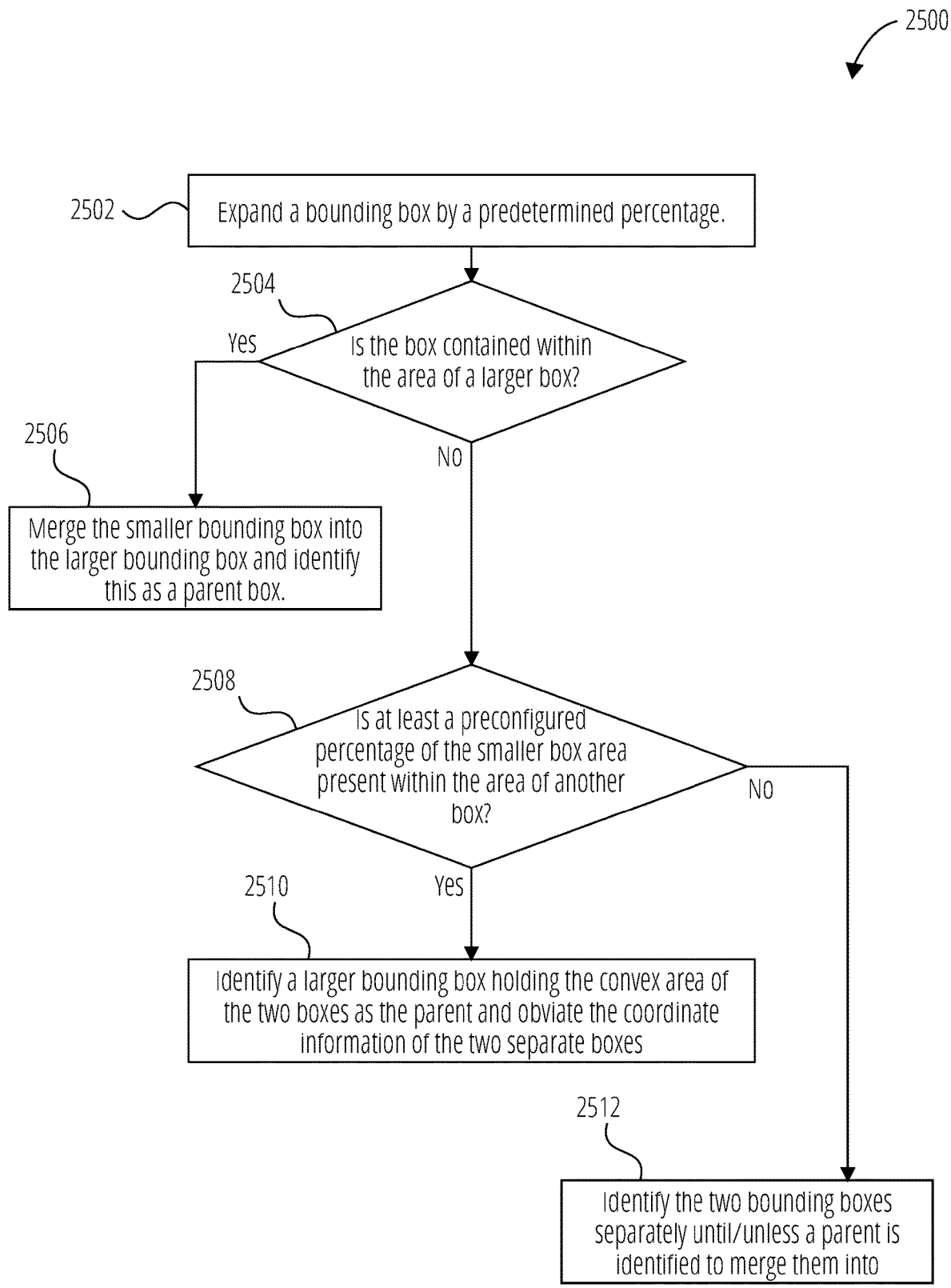
FIG. 25 depicts an algorithm for dense bounding boxes over a tightly packed text object 2500 in accordance with one embodiment.
Figure 26:
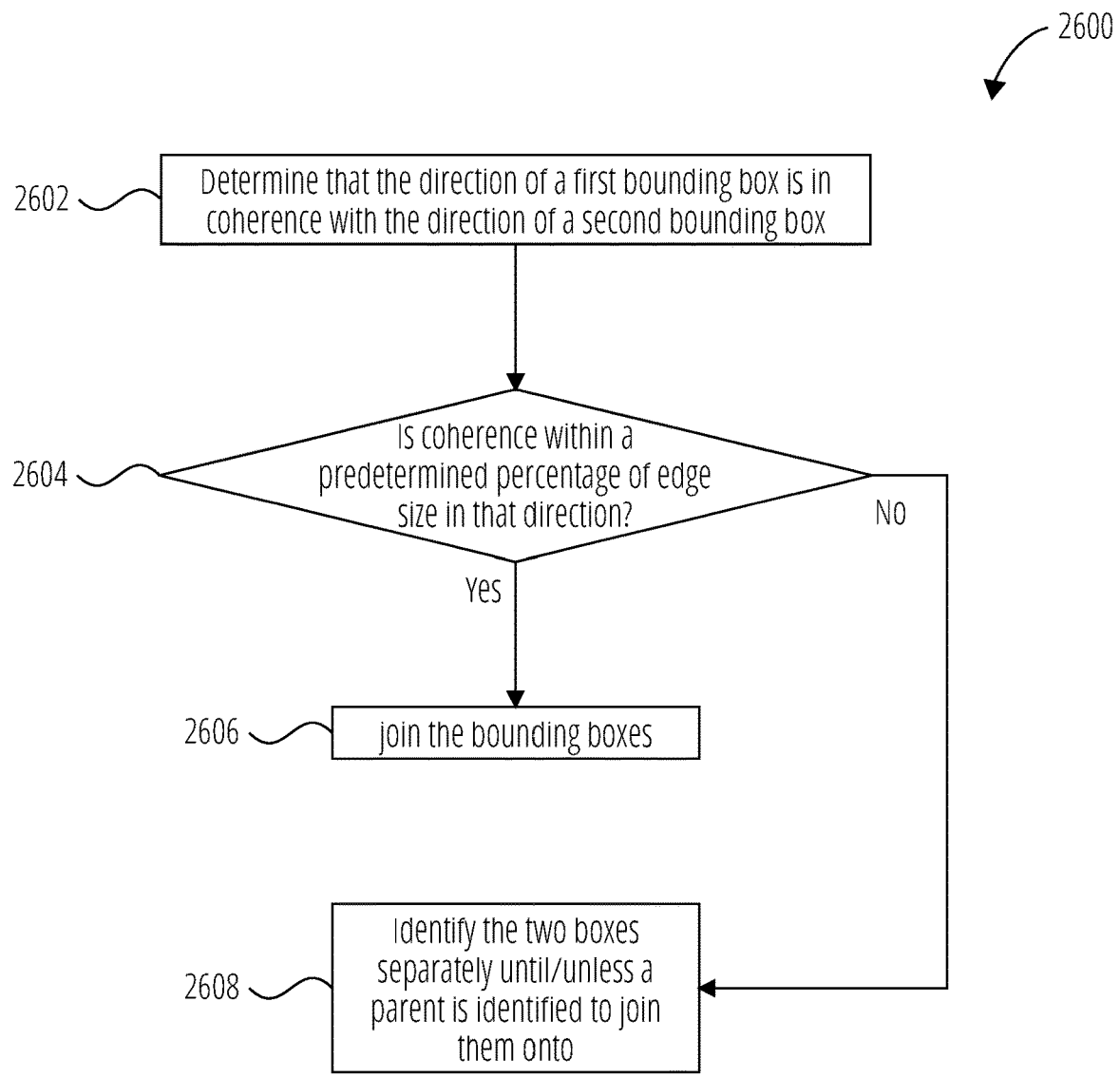
FIG. 26 depicts an algorithm for sparse bounding boxes over a widely spread out text object 2600 in accordance with one embodiment.

Embodiments of the bounding box algorithms, e.g., those depicted in FIG. 24, FIG. 25, and FIG. 26, may utilize one or more computational loops to compare centers of the bounding boxes and to define the extent of each from their top left and bottom right coordinates. An example of a generalized pseudocode for one such algorithm is provided in Listing 1.

Figure 6:
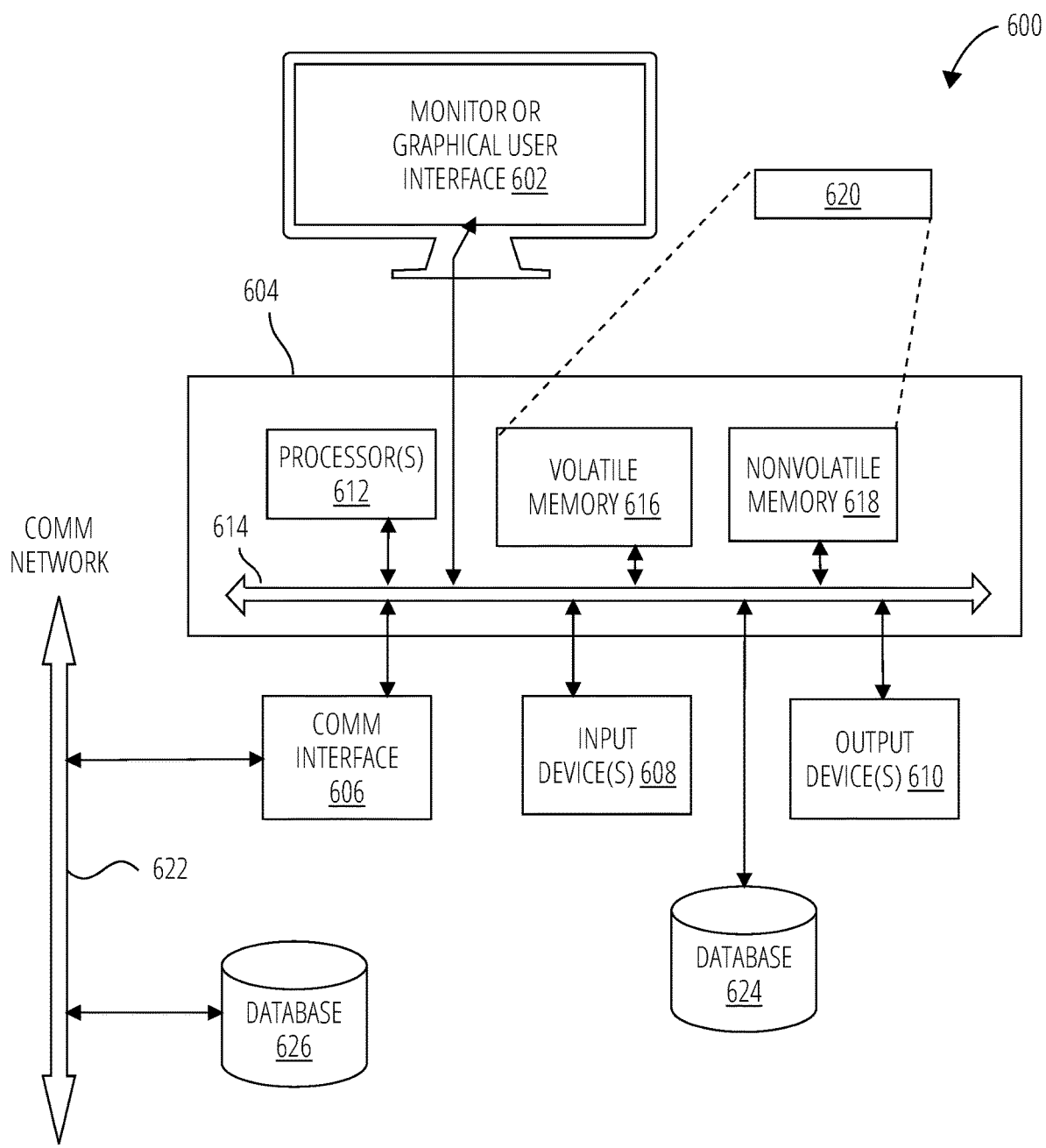
FIG. 6 is an example block diagram of a computing device 600 that may incorporate embodiments of the present disclosure.

FIG. 1 depicts a routine to detect and respond to a copy-guard digital stamp pattern 100 in accordance with one embodiment. In block 102, a scanning device may be operated to create a page image scanned from a document page. In one embodiment, a multifunction printer may be equipped with a document feed that takes in printed media such as a paper document and passes each page through a scanner that illuminates and photographs the page to create a digital page image. The scanning device may comprise all or part of a computing device 600, such as is depicted in FIG. 6.

In block 104, the page image may be input into a one-shot trained neural network configured to recognize a copy-guard digital stamp pattern using one-shot learning. In one embodiment, the one-shot trained neural network may be a twin neural network such as the exemplary twin neural network 700 depicted in FIG. 7. Example copy-guard digital stamp patterns 800 are depicted in FIG. 8. The one-shot trained neural network may in some embodiments be configured using the process depicted in the routine to configure a one-shot trained neural network 900 of FIG. 9.

In block 106, the page image may be analyzed using the one-shot trained neural network to detect the copy-guard digital stamp pattern. On condition the copy-guard digital stamp pattern is detected at decision block 108, an electronic alert may be issued in block 110. In one embodiment, the electronic alert may be sent to the scanning device. The operation of the scanning device may be halted upon receipt of the electronic alert. In one embodiment, the issue of the electronic alert may trigger a security issue notification. Such a notification may be sent to a corporate security officer via email in one embodiment, notifying this person of a potential document security breach.

If the copy-guard digital stamp pattern is not detected at decision block 108, a signal indicating no security issues may be issued in block 112. This signal indicating no security issues may in one embodiment be sent to the scanning device. The scanning device may continue operation upon receipt of the signal indicating no security issues.

Figure 2:
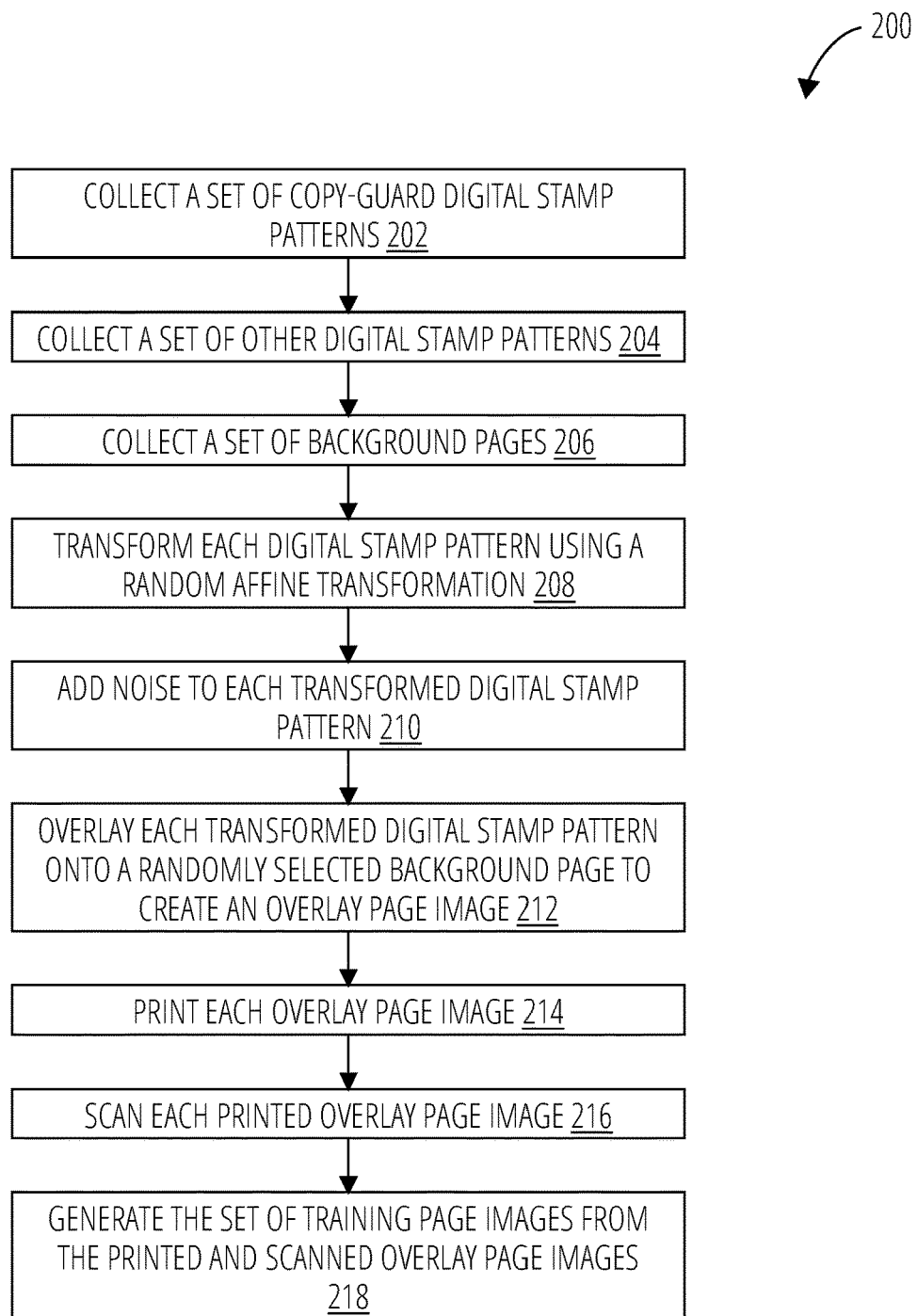
FIG. 2 depicts a routine to create a training page image dataset 200 in accordance with one embodiment.

FIG. 2 depicts a routine to create a training page image dataset 200 in accordance with one embodiment. In block 202, a set of copy-guard digital stamp patterns may be collected. These may be gathered from the Internet, databases provided by corporations, or other publicly or privately available sources. In block 204, a set of other digital stamp patterns may be similarly collected, as well as a set of background pages collected in block 206.

In block 208, each digital stamp pattern may be transformed in one or more ways using a random affine transformation. The random affine transformation may include translation, scale, homothety, similarity, reflection, rotation, or shear mapping transformation, and any combination of these.

In block 210, noise may be added to each transformed digital stamp pattern. Noise may also or alternatively be added to each of the collected background pages. In block 212, each transformed digital stamp pattern may be overlain onto a randomly selected background page from the set of background pages to create an overlay page image. In one embodiment, these overlay page images may comprise the set of training page images.

In another embodiment, each overlay page image may be physically printed in block 214. This may be printing using ink on a physical print medium such as paper. This may be performed to introduce the sort of real-world noise a document may incur in being printed, due to imperfections in physical printing equipment and media. Such noise might include gaps or skips in a printed pattern, blots or other pigment accumulation, such as might be caused by the texture of the print medium, defects in a printer feed track or roller drum, etc. Such flaws as noise may disrupt the matching capabilities of conventional pattern matching. The disclosed solution, however, has, as described, the ability to detect matches in spite of such details, representing a technical improvement over conventional pattern matching solutions.

In block 216, each printed overlay page image created in block 214 may be scanned to create a digital copy representing each printed overlay page image. In block 218, the set of training page images may be generated from the printed and scanned overlay page images created in block 216.

Figure 3:
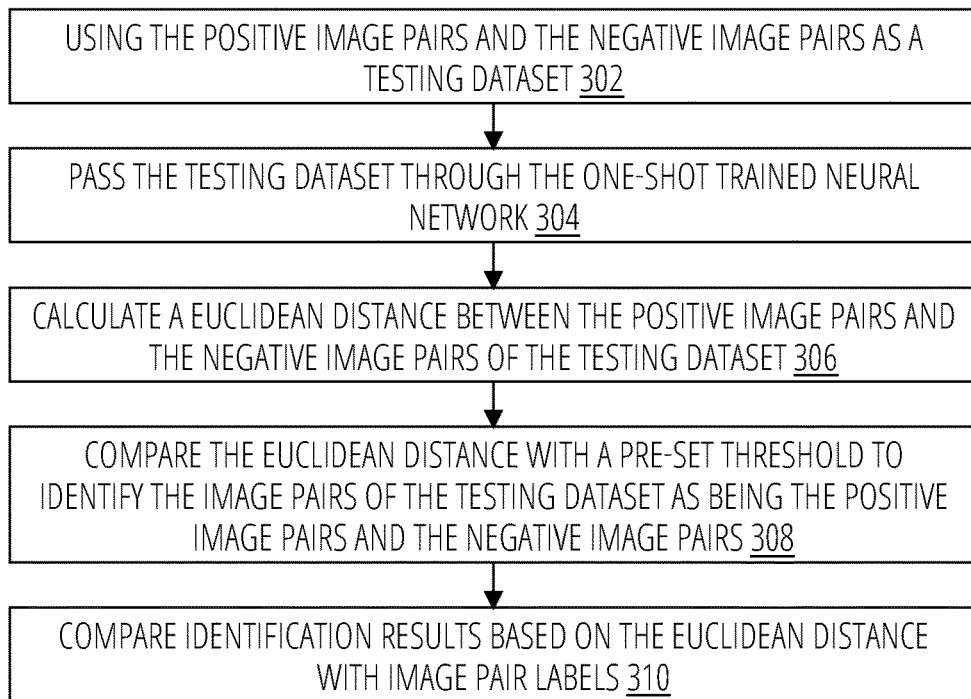
FIG. 3 depicts a routine to test a one-shot trained neural network 300 in accordance with one embodiment.

FIG. 3 depicts a routine to test a one-shot trained neural network 300 in accordance with one embodiment. In block 302, the positive image pairs and the negative image pairs generated as described in block 906 of FIG. 9 may be identified as a testing dataset in order to test the one-shot trained neural network configured in accordance with the steps depicted in FIG. 9. To do so, this testing dataset may be passed through the one-shot trained neural network in block 304.

In block 306, Euclidean distance may be calculated between the positive image pairs and the negative image pairs of the testing dataset based on the output of the one-shot trained neural network. In block 308, the Euclidean distance calculated in block 306 may be compared with a pre-set threshold to identify the image pairs of the testing dataset as being the positive image pairs and the negative image pairs. For example, the Euclidean distance may be compared with the pre-set threshold of 0.5, to make a "same" or "different" determination. In block 310, the identification results of block 308 may be compared with the image pair labels ("positive" or "1" and "negative" or "0" as previously described) to evaluate the accuracy of the results determined by the one-shot trained neural network. Weights within the network may be adjusted based on the findings of this test.

In one embodiment, the one-shot trained neural network may be a twin neural network, such that one half of the network may be trained and tested, the resulting changes then being applied to both halves. This may save much memory space and improve computational efficiency.

Figure 4:
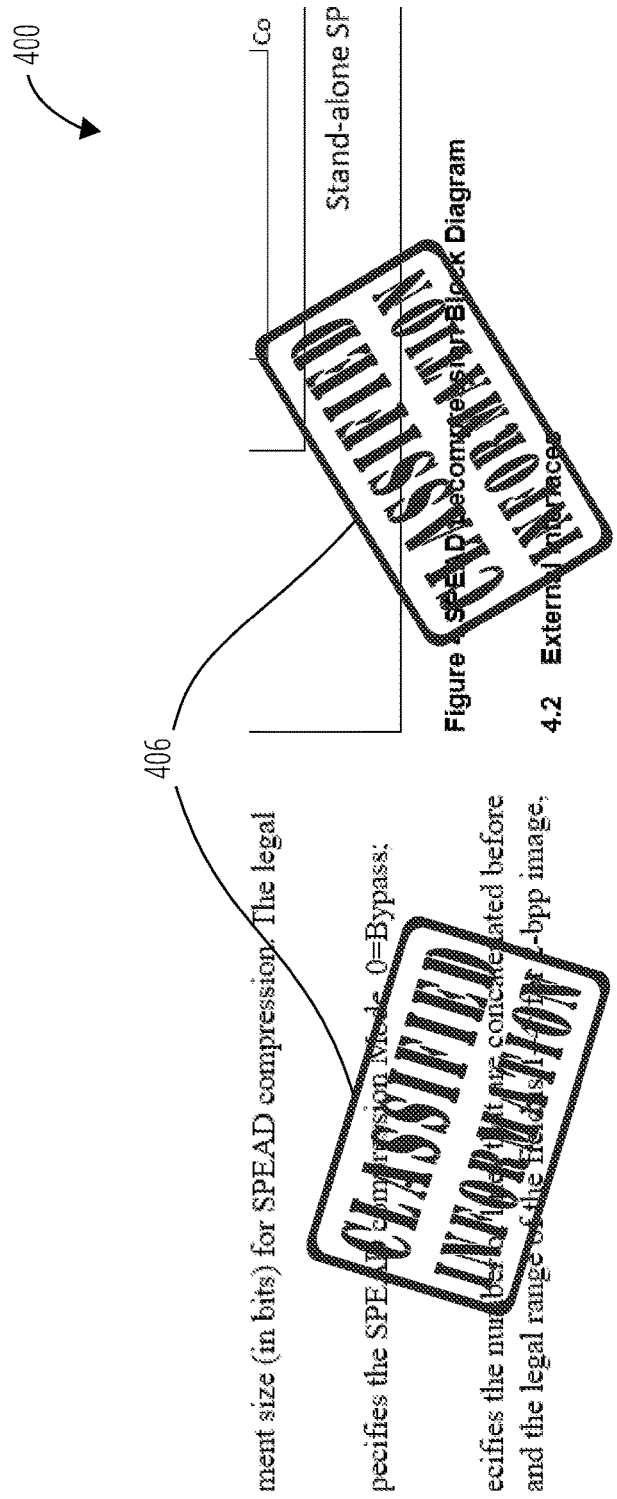
FIG. 4 depicts a positive image pair 400 in accordance with one embodiment.

FIG. 4 depicts a positive image pair 400 in accordance with one embodiment. Training page image 402 and training page image 404 comprise two different background pages that have been overlain with matching digital stamp patterns 406. The matching digital stamp patterns 406 have undergone differing rotational transformations. Matching digital stamp patterns may also each experience other affine transformations of an original digital stamp pattern, such as scale, shear mapping, etc., and combinations thereof.

Figure 5A:
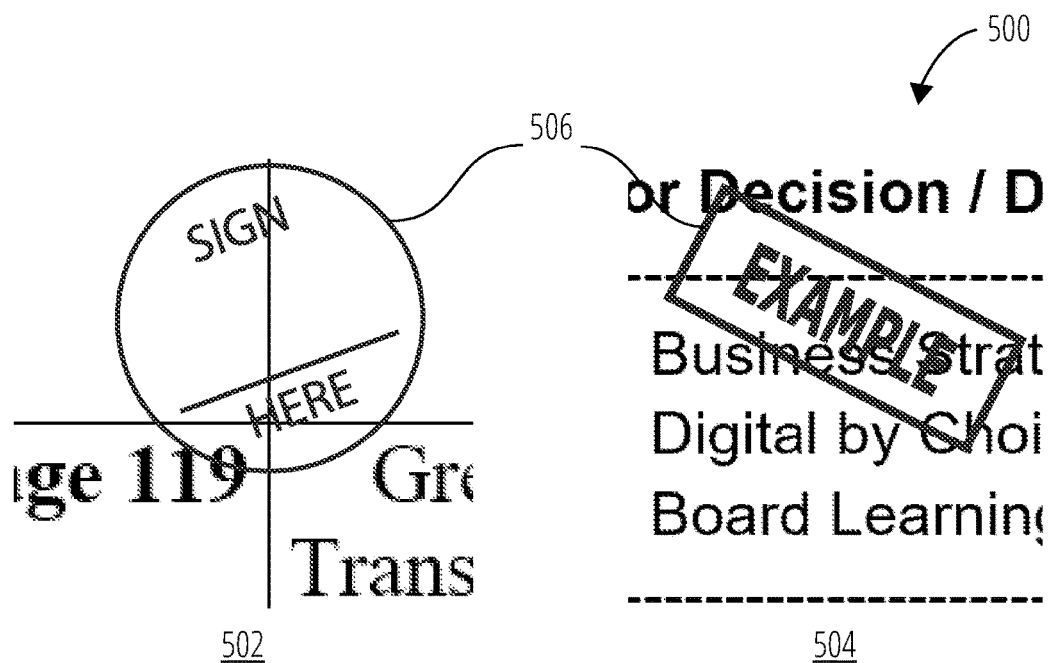
FIG. 5A and FIG. 5B illustrate negative image pairs 500 in accordance with one embodiment.
Figure 5B:
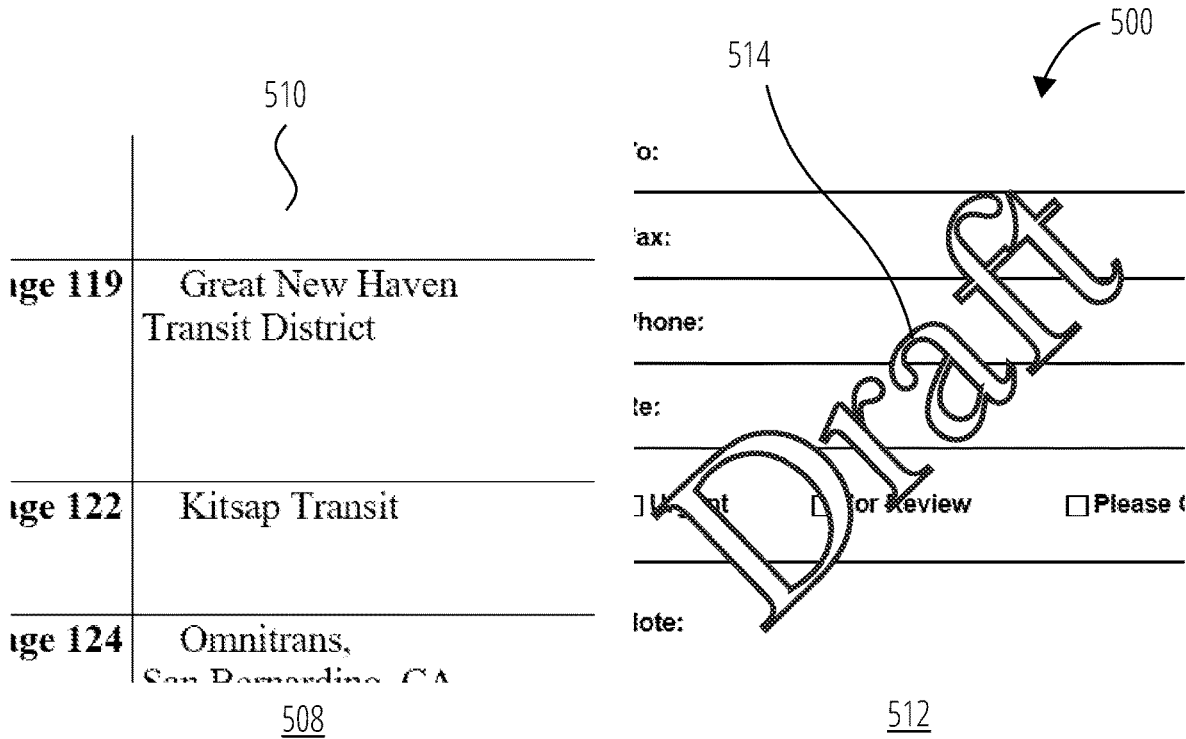

FIG. 5A and FIG. 5B illustrate negative image pairs 500 in accordance with one embodiment. FIG. 5A shows a negative image pair 500 comprising a training page image 502 and training page image 504, each superimposed with different digital stamp patterns 506.

FIG. 5B shows a negative image pair 500 comprising a training page image 508 that is a background page without the at least one digital stamp pattern 510 and a training page image 512 that is overlain with a digital stamp pattern 514.

FIG. 6 is an example block diagram of a computing device 600 that may incorporate embodiments of the present disclosure. Such a computing device 600 may complete the routine to detect and respond to a copy-guard digital stamp pattern 100 depicted in FIG. 1. FIG. 6 is merely illustrative of a machine system to carry out aspects of the technical processes described herein, and does not limit the scope of the claims. One of ordinary skill in the art would recognize other variations, modifications, and alternatives. In one embodiment, the computing device 600 typically includes a monitor or graphical user interface 602, a data processing system 604, a communication network interface 606, input device(s) 608, output device(s) 610, and the like.

As depicted in FIG. 6, the data processing system 604 may include one or more processor(s) 612 that communicate with a number of peripheral devices via a bus subsystem 614. These peripheral devices may include input device(s) 608, output device(s) 610, a communication network interface 606, and a storage subsystem, such as a volatile memory 616 and a nonvolatile memory 618.

The volatile memory 616 and/or the nonvolatile memory 618 may store computer-executable instructions thus forming instructions 620 that when applied to and executed by the processor(s) 612 implement embodiments of the processes disclosed herein. Processor(s) 612 may in some embodiments include neural network controllers such as may be configured as the exemplary twin neural network 700 introduced with respect to FIG. 7, refined twin neural networks, one-shot trained neural networks, fixed-point model neural networks, etc.

The input device(s) 608 include devices and mechanisms for inputting information to the data processing system 604. These may include a keyboard, a keypad, a touch screen incorporated into the monitor or graphical user interface 602, audio input devices such as voice recognition systems, microphones, and other types of input devices. In various embodiments, the input device(s) 608 may be embodied as a computer mouse, a trackball, a trackpad, a joystick, a wireless remote, a drawing tablet, a voice command system, an eye tracking system, and the like. The input device(s) 608 typically allow a user to select objects, icons, control areas, text, and the like that appear on the monitor or graphical user interface 602 via a command such as a click of a button or the like. Input device(s) 608 may include scanning devices such as are used to implement the disclosed solution, and such as are present in scanners, multifunction printers, and the like.

The output device(s) 610 include devices and mechanisms for outputting information from the data processing system 604. These may include the monitor or graphical user interface 602, speakers, printers, infrared light emitting diodes (LEDs), and so on as well understood in the art.

The communication network interface 606 provides an interface to communication networks (e.g., communication network 622) and devices external to the data processing system 604. The communication network interface 606 may serve as an interface for receiving data from and transmitting data to other systems. Embodiments of the communication network interface 606 may include an Ethernet interface, a modem (telephone, satellite, cable, integrated services digital network or ISDN), (asynchronous) digital subscriber line (DSL), FireWire, USB, a wireless communication interface such as BlueTooth or Wi-Fi, a near field communication wireless interface, a cellular interface, and the like.

The communication network interface 606 may be coupled to the communication network 622 via an antenna, a cable, or the like. In some embodiments, the communication network interface 606 may be physically integrated on a circuit board of the data processing system 604, or in some cases may be implemented in software or firmware, such as "soft modems", or the like.

The computing device 600 may include logic that enables communications over a network using protocols such as HTTP, TCP/IP, RTP/RTSP, IPX, UDP, and the like.

The volatile memory 616 and the nonvolatile memory 618 are examples of tangible media configured to store computer-readable data and instructions to implement various embodiments of the processes described herein. Other types of tangible media include removable memory (e.g., pluggable USB memory devices, mobile device SIM cards), optical storage media such as CD-ROMS, DVDs, semiconductor memories such as flash memories, non-transitory read-only-memories (ROMS), battery-backed volatile memories, networked storage devices, and the like. The volatile memory 616 and the nonvolatile memory 618 may be configured to store the basic programming and data constructs that provide the functionality of the disclosed processes and other embodiments thereof that fall within the scope of the present disclosure.

The memory may also include a database 624. In some embodiments, the computing device 600 may additionally or alternatively communicate with a database 626 via communication network 622, a storage area network ("SAN"), a high-speed serial bus, and/or via other suitable communication technology.

In some embodiments, database 626 may comprise one or more storage resources provisioned from a "cloud storage" provider, for example, Amazon Simple Storage Service ("Amazon S3"), provided by Amazon.com, Inc. of Seattle, Washington, Google Cloud Storage, provided by Google, Inc. of Mountain View, California, and the like.

Instructions 620 that implement embodiments of the present disclosure may be stored in the volatile memory 616 and/or the nonvolatile memory 618. Said instructions 620 may be read from the volatile memory 616 and/or nonvolatile memory 618 and executed by the processor(s) 612. The volatile memory 616 and the nonvolatile memory 618 may also provide a repository for storing data used by the instructions 620.

The volatile memory 616 and the nonvolatile memory 618 may include a number of memories including a main random-access memory (RAM) for storage of instructions and data during program execution and a read-only memory (ROM) in which read-only non-transitory instructions are stored. The volatile memory 616 and the nonvolatile memory 618 may include a file storage subsystem providing persistent (non-volatile) storage for program and data files. The volatile memory 616 and the nonvolatile memory 618 may include removable storage systems, such as removable flash memory.

The bus subsystem 614 provides a mechanism for enabling the various components and subsystems of data processing system 604 communicate with each other as intended. Although the communication network interface 606 is depicted schematically as a single bus, some embodiments of the bus subsystem 614 may utilize multiple distinct busses.

It will be readily apparent to one of ordinary skill in the art that the computing device 600 may be a device such as a smartphone, a desktop computer, a laptop computer, a rack-mounted computer system, a computer server, or a tablet computer device. As commonly known in the art, the computing device 600 may be implemented as a collection of multiple networked computing devices. Further, the computing device 600 will typically include operating system logic (not depicted) the types and nature of which are well known in the art.

Figure 7:
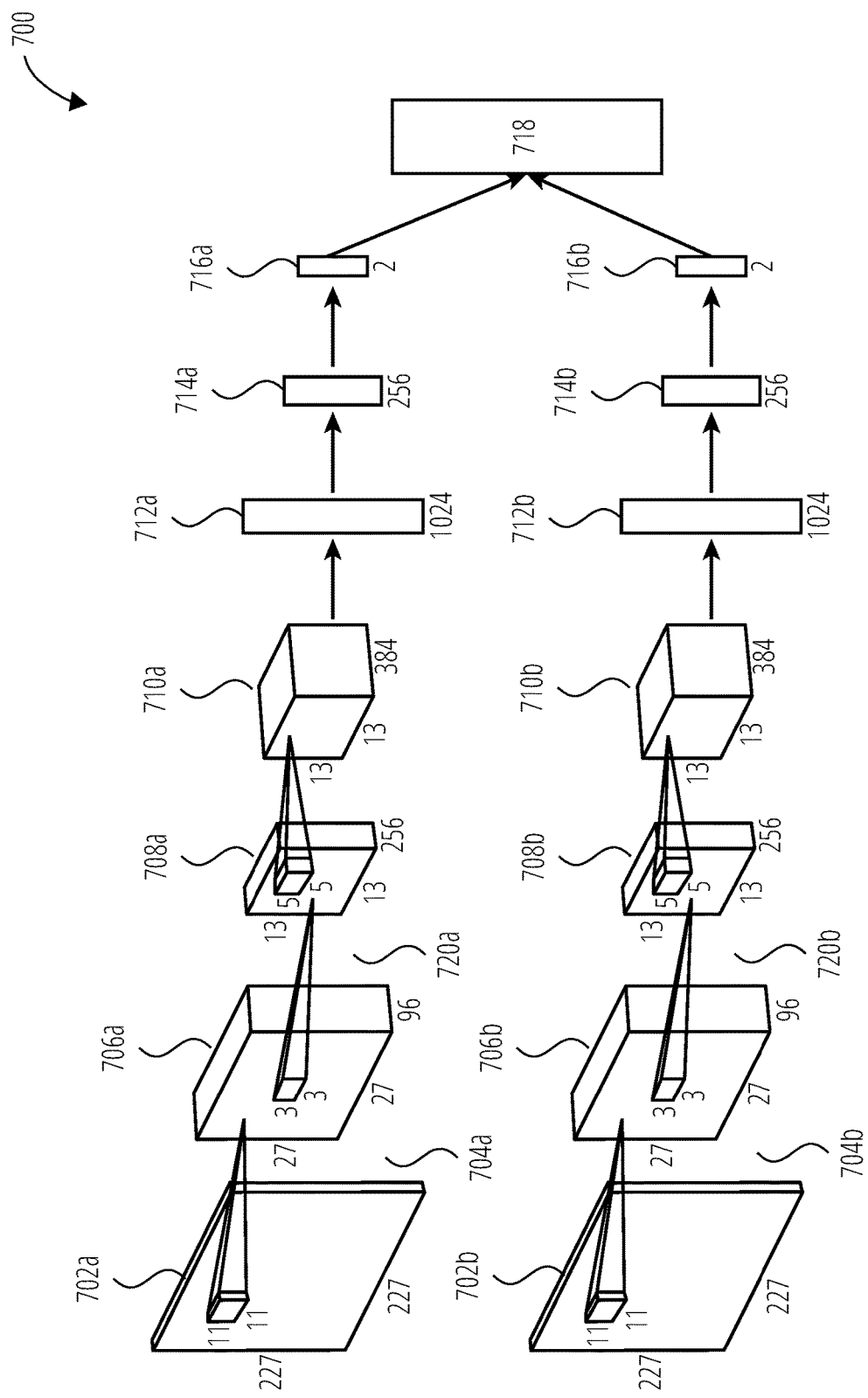
FIG. 7 depicts an exemplary twin neural network 700 such as might be used to implement the disclosed solution.

FIG. 7 depicts an exemplary twin neural network 700 such as might be used to implement the disclosed solution. Twin neural networks comprise two neural networks that take a pair of images as input and share a common contrastive loss function. The two networks of the twin neural network are identical to each other in their architecture and share the same weights.

The exemplary twin neural network 700 may receive an original image 702a and an original image 702b as an image pair. These may be resized to (for example) 227 by 227 as input to the first layer of the exemplary twin neural network 700 (subsampling 704a and subsampling 704b to convolution layer 706a and a convolution layer 706b).

The image pair may be processed through a dedicated six-layer feed-forward network as shown. The first three layers (convolution layers 706a and 706b, convolution layers 708a and 708b, and convolution convolutional layers 710a and 710b) may be convolutional. The last three layers (fully connected layers 712a and 712b, fully connected layers 714a and 714b, and fully connected layers 716a and 716b) may be fully connected. During training, the outputs of the last layer from each network (i.e., fully connected layers 716a and 716b) may be used to compute the loss using for example a contrastive loss function 718.

In one embodiment, the convolution layers may be built from the pre-trained weights on the ImageNet LSVRC-2012 dataset. Such initialization may help compensate for a limited dataset. The first convolution layer (706a and 706b) may filter (subsampling 704a and 704b) the 227×227×3 input images 702a and 702b with 96 kernels of size 11×11×3 with a stride of 4 pixels. The second convolution layer (708a and 708b) may take as input the (response-normalized and pooled) output of the first convolutional layer and filter it (subsampling 720a and 720b) with 256 kernels of size 5×5×96. The third convolutional layer (710a and 710b) may then have 384 kernels of size 3×3×256 connected to the (normalized, pooled) outputs of the second convolutional layer. The fourth (712a and 712b), fifth (714a and 714b), and sixth (716a and 716b) layers may be fully connected with 1024, 256, and 2 units, respectively. Configuring the last fully connected layer with two units allows the extraction of a two-dimensional representation of the data.

The contrastive loss function 718 may be an energy-based function designed to move the representations of input pairs that are supposed to be "the same" closer together, and those that are supposed to be "different" farther apart. $X_1$ and $X_2$ may be two images presented to the system, one to each network. Y may be a binary label assigned to the pair, with Y=1 if the images are supposed to be similar, and Y=0 if they are supposed to be different. $G_1$ and $G_2$ may be the activation vectors of the last layer of each network, just before the contrastive loss function 718 (i.e., the activation vectors of fully connected layer 716a and fully connected layer 716b). One embodiment of a contrastive loss function 718 that may be utilized is described further in conjunction with FIG. 9.

Rectified linear units (ReLU) activation functions may be used throughout this architecture. A base learning rate of 0.0001 and a step learning rate policy with a step size of 5000 may be utilized. The margin m may be set to 1. Dropout may be used after the fourth and the fifth fully connected layers. Training the model on a single graphics processing unit (GPU) may take around 5 hours. The layers may be initialized with Xavier initialization. Stochastic batch gradient descent may be used during training. Other configurations may be readily apparent to one of ordinary skill in the art.

FIG. 8 depicts example copy-guard digital stamp patterns 800 in accordance with one embodiment. A classified information digital stamp pattern 802 and a do not copy copy-guard digital stamp pattern 804 are shown. These example copy-guard digital stamp patterns 800 may be analyzed for stamp pattern key-points and stamp pattern descriptors, described in greater detail with respect to FIG. 10, so as to identify unique features found in the image representing the specific example copy-guard digital stamp patterns 800.

Figure 9:
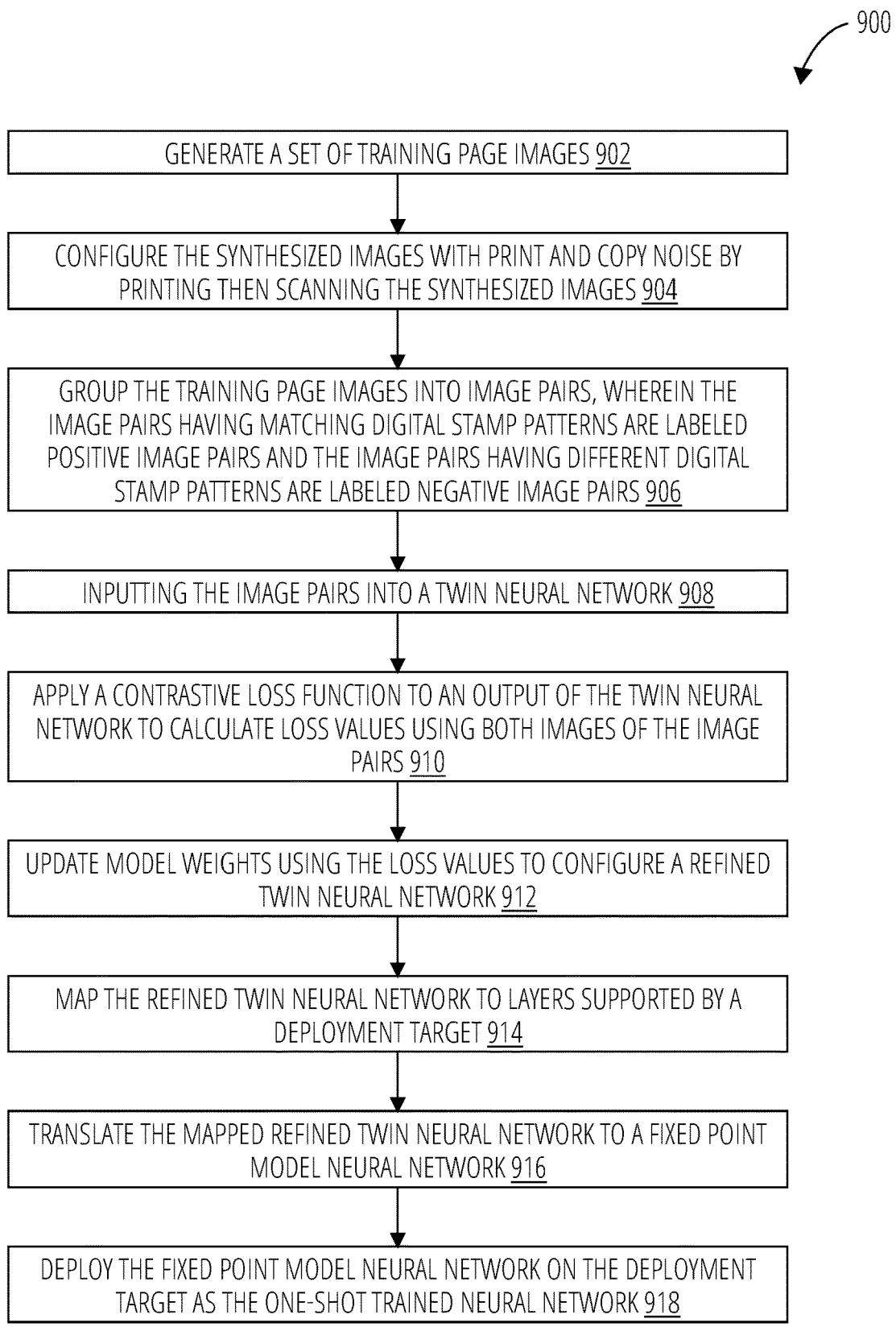
FIG. 9 depicts a routine to configure a one-shot trained neural network 900 in accordance with one embodiment.

FIG. 9 depicts a routine to configure a one-shot trained neural network 900 in accordance with one embodiment. In block 902, a set of training page images may be generated. Each of the training page images of the set of training page images may be a background page or a background page and at least one digital stamp pattern. The at least one digital stamp pattern may be a copy-guard digital stamp pattern or another digital stamp pattern. A routine to create a training page image dataset 200 is described with respect to FIG. 2.

Once the synthesized training page images are created, they may be configured with real-world print and copy noise in block 904 by printing the images onto a print medium such as paper, then scanning the synthesized images to form new digital page images.

In block 906, the training page images may be grouped into image pairs. Image pairs having matching digital stamp patterns may be labeled positive image pairs. A positive image pair 400 is depicted in FIG. 4. Image pairs having different digital stamp patterns may be labeled negative image pairs. Negative image pairs 500 are depicted in FIG. 5A and FIG. 5B. In one embodiment, at least one of the image pairs having different digital stamp patterns (i.e., one of the negative image pairs) may include a background page without any digital stamp pattern, such as is depicted in FIG. 5B. Pairs of images showing the same stamp may additionally or alternately be labeled as "1". Pairs showing different stamps and pairs where one or both images contain no stamp may be labeled as "0".

In block 908, the image pairs may be input into a twin neural network, such as the exemplary twin neural network 700 of FIG. 7. In block 910, a system element implementing a contrastive loss function may be operated on the resulting output of the twin neural network. This may be performed to calculate loss values using both images of the image pairs. A contrastive loss function such as the following may be used:

$$L = (1 - Y)\frac{1}{2}(D_w)^2 + (Y)\frac{1}{2}\{\max(0, m - D_w)\}^2$$

where L is the contrastive loss value, and $D_\omega$ is the Euclidean distance determined by:

$$\sqrt{\{G_\omega(X_1) - G_\omega(X_2)\}^2}$$

where $G_\omega$ is the output of the disclosed network for one image, and where $D_\omega = \|G_1 - G_2\|$, the Euclidean distance between the activation vectors, where the subscript indicates the dependence on the weights W of the network, and m>0 is a margin.

$X_1$ and $X_2$ represent the two images presented to the system, one to each network. Y is a binary label assigned to the pair, with Y=1 if the images are ground truth similar, and Y=0 if they are ground truth different. $G_1$ and $G_2$ are the activation vectors of the last layer of each network This loss function models the operation of mechanical springs, where minimizing the first term corresponds to a spring pulling $G_1$ and $G_2$ closer together, and the second term corresponds to a repulsing spring, pushing $G_1$ and $G_2$ farther apart. This loss function may be optimized by gradient descent. In order to map the faces into a two-dimensional space, $G_1$ and $G_2$ are composed of two units.

In block 912, model weights may be updated using the loss values calculated in block 910 to configure a refined twin neural network. In block 914, the refined twin neural network may be mapped to layers supported by a deployment target. The deployment target may be a computing device 600 such as a neural network controller incorporated within a multifunction printer, a copy machine, a scanner, or a similar device.

In block 916, the mapped refined twin neural network may be translated to a fixed-point model neural network. The fixed-point model neural network may then, in block 918, be deployed on the deployment target as the one-shot trained neural network.

Figure 10:
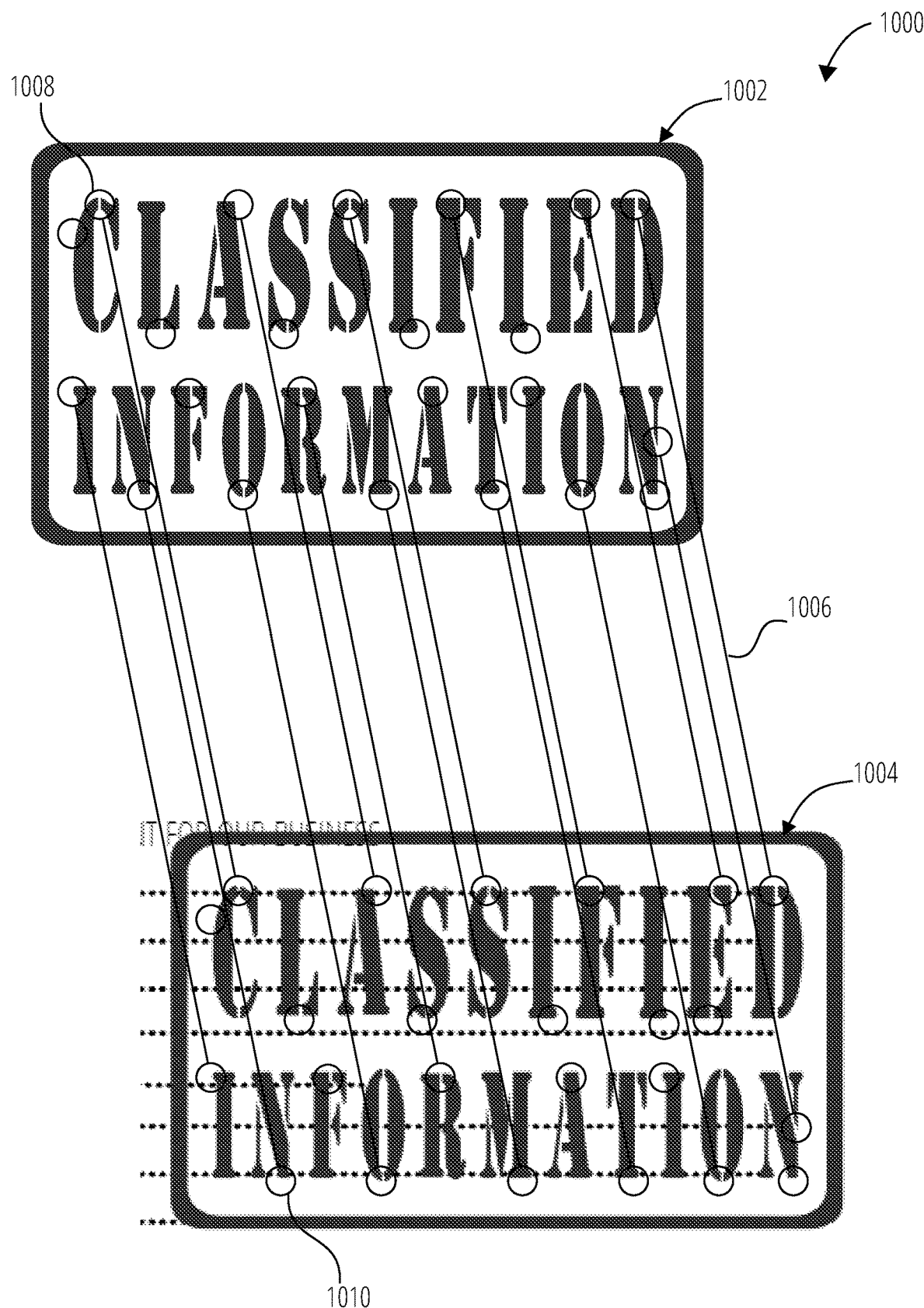
FIG. 10 depicts pattern matching digital stamp patterns 1000 in accordance with one embodiment.

FIG. 10 depicts a pattern matching digital stamp patterns 1000 in accordance with one embodiment. The original template pattern image from digital stamp pattern 1002 may be compared with the cropped region at full resolution 1004 using feature-based pattern matching 1006. Feature based pattern matching 1006 may identify similarities between the stamp pattern key-points and stamp pattern descriptors 1008 and the cropped region key-points and cropped region descriptors 1010. These similarities may be deemed qualified matches, and a number of qualified matches exceeding a pre-set threshold may indicate a match between the page inserted in the printer and a digital stamp pattern.

In one embodiment, where the digital stamp pattern is for a confidentiality or security stamp, a match may generate an alert for a possible security issue. Such a generated alert may result in a number of actions, such as preventing printing of the document inserted into the multifunction printer, sending a security alert email to personnel responsible for managing document security, etc.

In cases where the number of qualified matches does not meet the pre-set threshold, the full resolution original document may be determined not to contain a digital stamp pattern, and a signal indicating no security issues may be generated. In cases where security stamps are of particular interest, documents not containing the digital stamp pattern corresponding to a security stamp, a signal indicating no security issues may trigger the MFP to complete copying, scanning, or printing of the full resolution original document.

Figure 11:
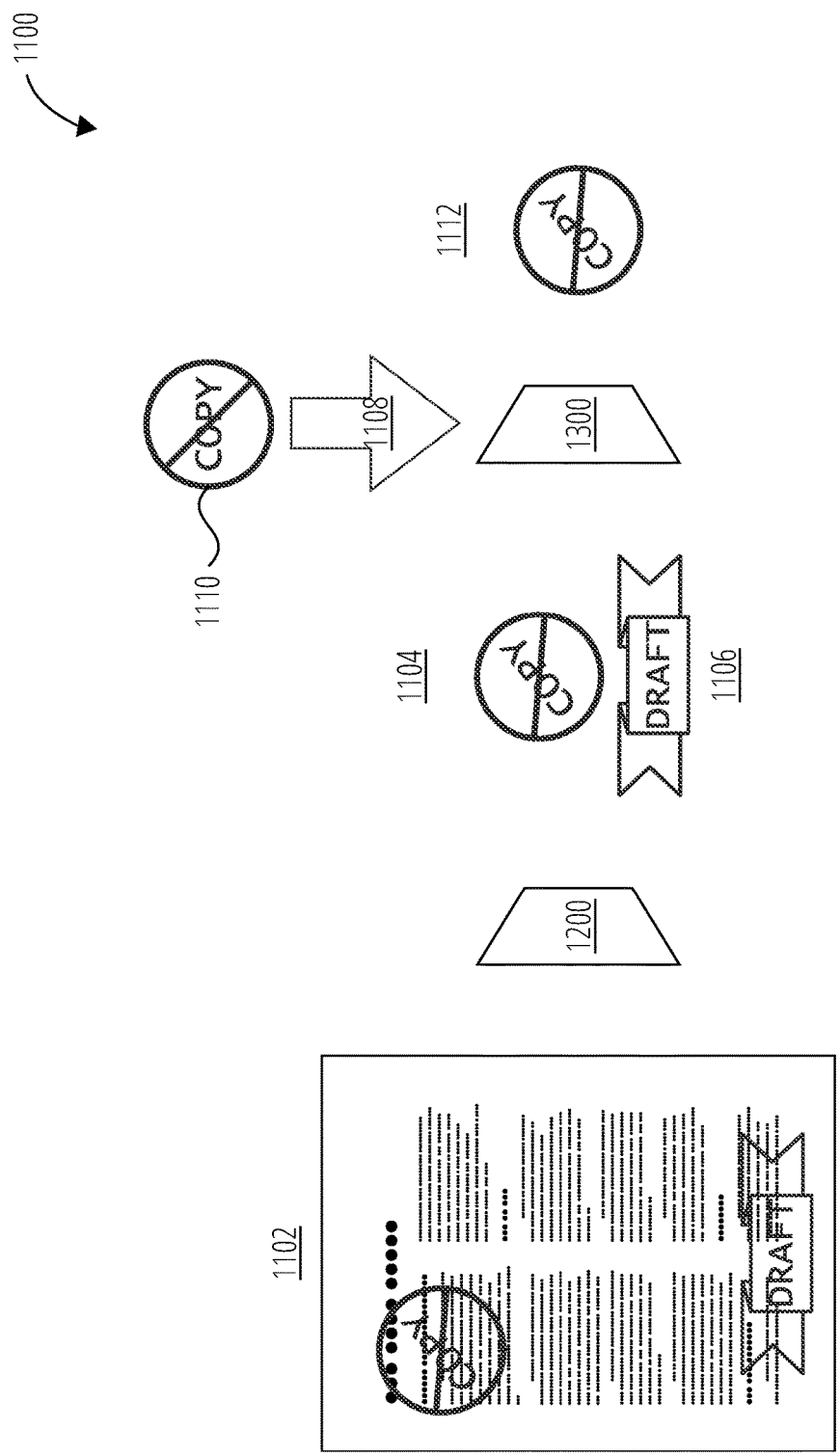
FIG. 11 depicts a two-stage custom security pattern detector 1100 in accordance with one embodiment.

FIG. 11 depicts a two-stage custom security pattern detector 1100 in accordance with one embodiment. The two-stage custom security pattern detector 1100 comprises a first stage 1200 and a second stage 1300. The two-stage custom security pattern detector 1100 delineates a page region comprising a candidate copy guard mark, facilitating an accurate determination of whether a detected mark matches a registered mark template.

The first stage 1200 receives and analyzes a scanned document page 1102 for probable locations where candidate security patterns may be present. The size and orientation of the scanned document page 1102 may be variable. The first stage 1200 identifies and isolates, in the depicted example, a first candidate stamp 1104 and a second candidate stamp 1106 (in practice there may be many or fewer than two candidates).

The first candidate stamp 1104 and second candidate stamp 1106 are input to the second stage 1300. In one embodiment, the second stage 1300 is configured through one-shot learning 1108 to detect a registered security pattern 1110. The second stage 1300 may detect that first candidate stamp 1104 matches registered security pattern 1110, and may identify it as a matching stamp 1112.

Figure 14:
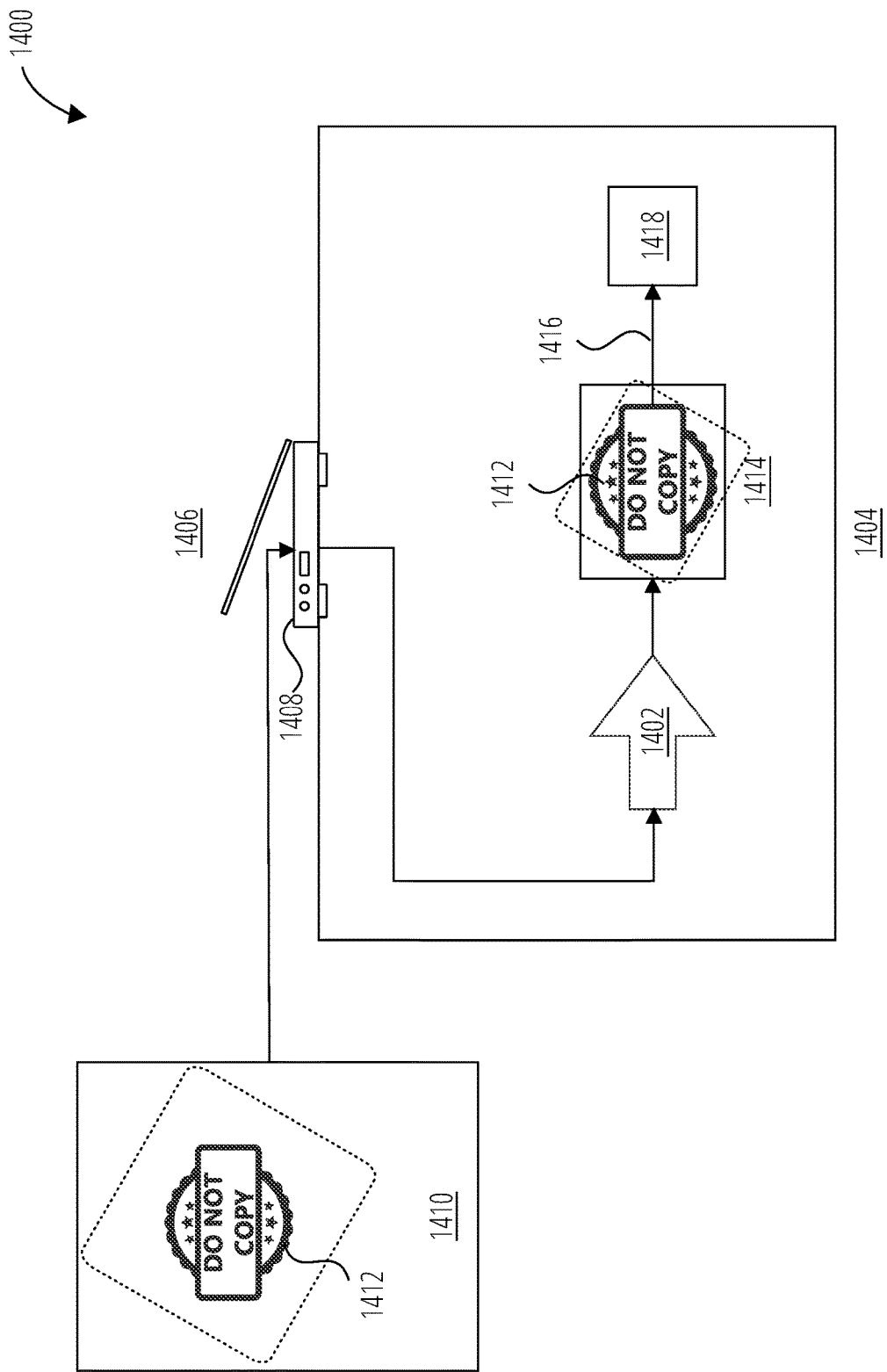
FIG. 14 depicts a custom template extraction and registration 1400 in accordance with one embodiment.

FIG. 12 depicts a first stage 1200 of the two-stage custom security pattern detector 1100 in accordance with one embodiment. The first stage 1200 utilizes a pattern localizer 1202 to analyze a scanned page 1204 and identify probably locations where candidate copy guard marks or security patterns, such as security keywords 1206, copy guard stamps 1208, and customer specific patterns 1210, may be present. The pattern localizer 1202 in one embodiment may be implemented by logic (e.g., a hardware controller application-specific integrated circuit (ASIC)) of a scanner or photocopier, as depicted in FIG. 14.

Size and orientation of the scanned page 1204 may be variable. For this reason, using a deep-learning based object detector as the pattern localizer 1202 may improve the speed and robustness of the process and may facilitate the re-identification process by presetting candidate pattern locations to comply with the input parameters for the template matching stage.

In the depicted example, the pattern localizer 1202 identifies a first candidate 1212, second candidate 1214, and third candidate 1216 pattern locations. These candidates may be isolated as cropped regions 1218 of the scanned page 1204 for analysis at the second stage 1300 of the two-stage custom security pattern detector 1100.

Figure 13:
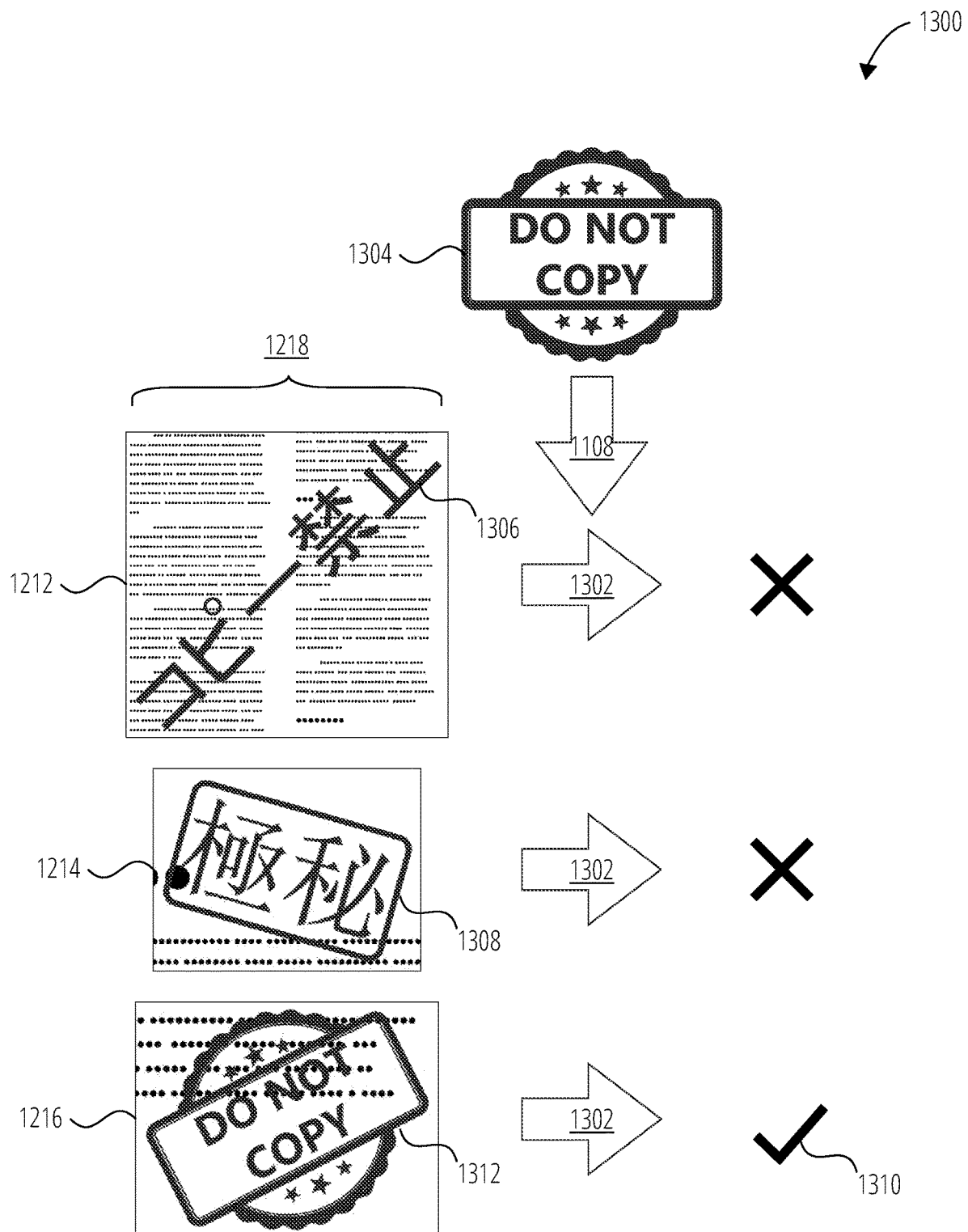
FIG. 13 depicts a second stage 1300 in accordance with one embodiment.

FIG. 13 depicts a second stage 1300 of the two-stage custom security pattern detector 1100 in accordance with one embodiment. The second stage 1300 may carry out re-identification of a registered security pattern by matching it with candidate locations using a template matcher 1302.

The copy guard mark candidates (e.g., first candidate 1212, second candidate 1214, and third candidate 1216), discovered through the pattern localizer 1202 in the first stage 1200, may each be compared with a registered security pattern 1304, using the template matcher 1302. A registered security pattern 1304 may be registered through custom template extraction and registration 1400, as depicted in FIG. 14.

FIG. 13 depicts an example of output from the template matcher 1302 of the second stage 1300. The template matcher 1302 may detect that the different pattern 1306 of first candidate 1212 and the different pattern 1308 of second candidate 1214 do not match, but may detect a match 1310 after analyzing the same pattern 1312 for the third candidate 1216, even when the same pattern 1312 has been rotated, reflected, scaled, changed in color, or undergone some other affine transformation.

A one-shot learning-based template matcher 1302 may perform well and may operate from a single example of the registered security pattern 1304. Utilizing one-shot learning 1108 may obviate the need to train the system with many variations of a security pattern or copy guard mark to account for the many ways it may vary in presentation in actual documents.

FIG. 14 depicts custom template extraction and registration 1400 in accordance with one embodiment. An object detection and localization application 1402 may be implemented (for example) on a hardware controller ASIC 1404 of a photocopier or scanner 1406 or similar device, which may be configured with a scanning element 1408. The object detection and localization application 1402 may register a copy guard pattern such as a stamp or watermark.

In one embodiment, a template page 1410 comprising a copy guard pattern 1412 over a white uniform background may be captured through the scanning element 1408 of the photocopier or scanner 1406 and presented to the object detection and localization application 1402 to detect a cropped region 1414 comprising the copy guard pattern 1412. Information 1416 for the copy guard pattern 1412 may be stored by the machine administrator securely in ASIC hardware memory 1418.

Figure 15:
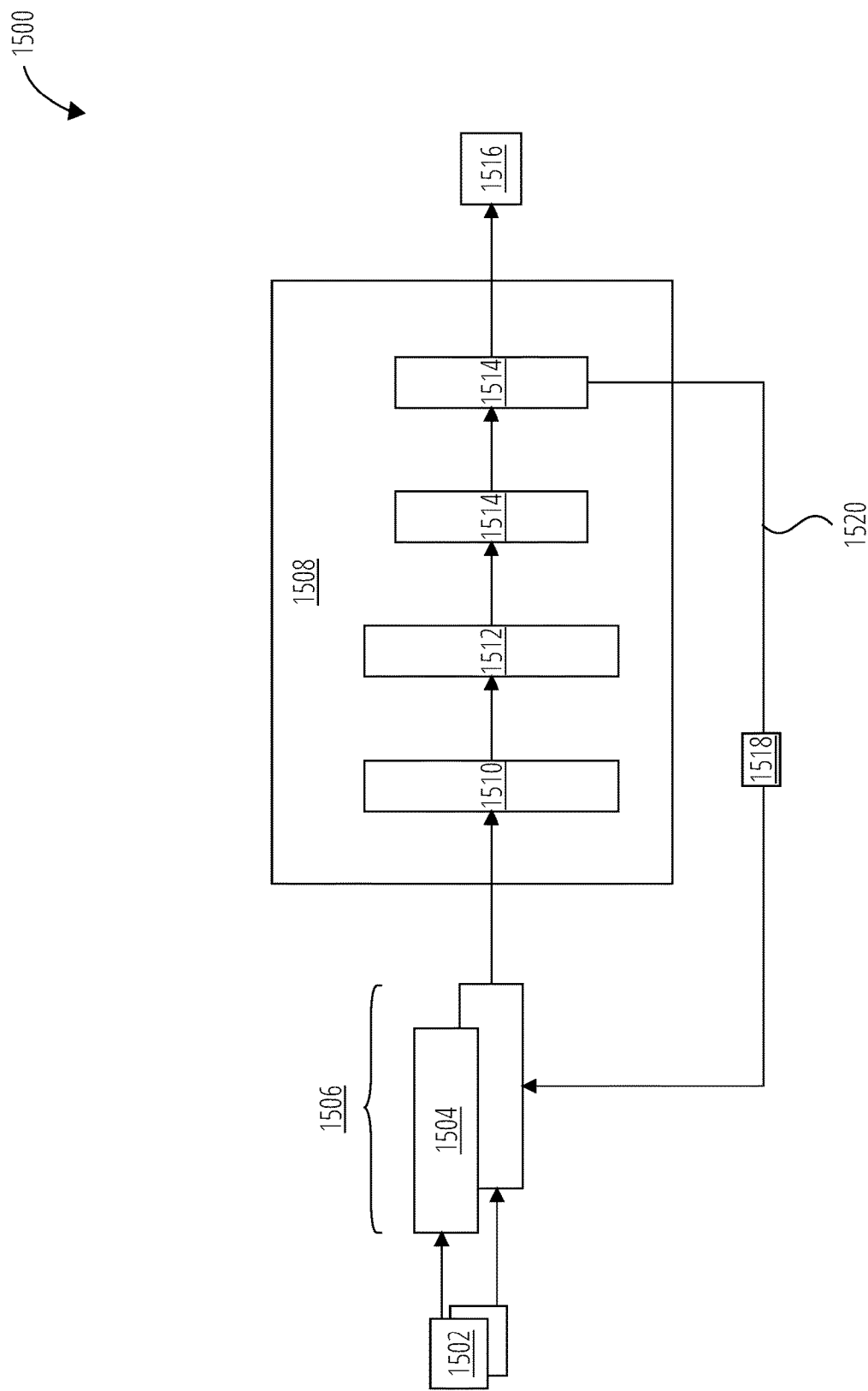
FIG. 15 depicts a system 1500 in accordance with one embodiment.

FIG. 15 depicts a system 1500 in accordance with one embodiment. The system 1500 comprises an image pair 1502, a pair of identically weighted networks 1504 trained to perform feature extraction 1506 on the image pair 1502, a match head 1508, a concatenation layer 1510, a flattening layer 1512, two fully connected layers 1514 that output a match score 1516, and a contrastive loss element 1518 configured along a feedback path 1520 from the fully connected layer 1514 to the pair of identically weighted networks 1504.

Figure 19:
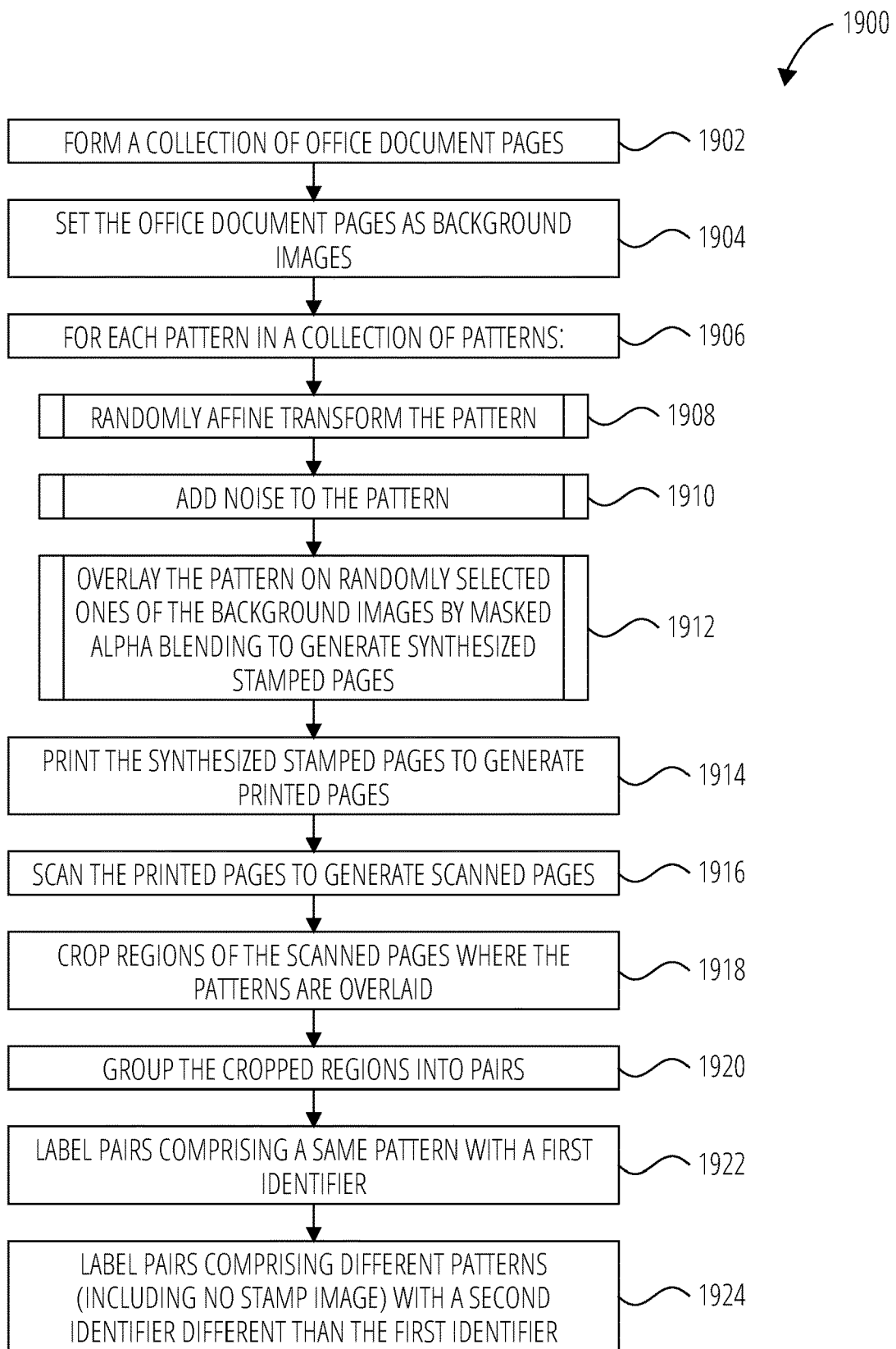
FIG. 19 depicts a process 1900 in accordance with one embodiment.

The pair of identically weighted networks 1504 may be trained to perform feature extraction 1506 on images, such as the image pair 1502 shown. In one embodiment, the system 1500 may utilize supervised learning processes, such as depicted in FIG. 19, to train the pair of identically weighted networks 1504. The pair of identically weighted networks 1504 may in one embodiment comprise a pair of identical Resnet50 networks. Other convolutional neural network (CNN) models may also be utilized.

The match head 1508 may comprise a concatenation layer 1510, a flattening layer 1512, and two fully connected layers 1514. The match head 1508 may be configured to predict whether or not the image pair 1502 comprise a same stamp pattern. The match head 1508 may incorporate a feedback path 1520 comprising a contrastive loss element 1518 from the fully connected layers 1514 to the pair of identically weighted networks 1504.

In one embodiment, the contrastive loss element 1518 may be configured to use distance-based loss as opposed to more conventional error-prediction losses. This loss may be used to learn embeddings in which two similar points have a low Euclidean distance and two dissimilar points have a large Euclidean distance. One such contrastive loss function is elaborated on in conjunction with FIG. 9.

Because the weights are constrained to be identical for both networks in the pair of identically weighted networks 1504, during training, one of the two networks may be utilized for feature extraction, and be supplied with two images in succession. After that, the loss value may be calculated using results for both the images, and then backpropagated. This may save memory and may also be more computationally efficient than other training approaches. The weights in both networks may be updated and the model saved, then this process may be iterated for many epochs.

Cropped regions of a scanned page 1204 for analysis by the system 1500 may be identified by a pattern localizer 1202, as depicted in FIG. 12. Image pairs may be formed by pairing these cropped regions with registered security patterns. These image pairs may be passed through the pair of identically weighted networks 1504 and the Euclidean distance found between the images of the image pair. This Euclidean distance may be compared with a preset threshold, such as 0.5, to make a "same" (i.e., a distance greater than 0.5) or a "different" (i.e., a distance less than 0.5) determination. This determination may then be checked against a label previously assigned to the image pair. These parameters and their values for determining a match are provided as examples and are not intended to limit the scope of the present disclosure. In one embodiment, a "different" label may be appropriate where a distance greater than 0.2 is detected. In another application, a distance greater than 0.8 may be used to determine that a pair is "different".

Once the model has been trained and tested, it may be deployed to a target. The target may be a security-detection enabled commercial photocopier, scanner, printer, multifunction printer, or similar device. The trained and tested model may be mapped to layers supported by the target device. A translation to a fixed-point model may be completed, and the deployed model may be appropriately recalibrated.

FIG. 16 depicts pattern localization and template matching applied to a scanned document 1600, in accordance with one embodiment. A document may comprise a custom stamp or watermark that manifests as a copy guard mark 1602 on a scanned page 1604 of the document. The pattern localizer 1202 may zoom into regions of high probability 1606 of locating the copy guard mark 1602. The template matcher 1302 may cross compare content in the detected regions of high probability 1606 with one or more registered security patterns 1608.

A match probability may be determined based on the cross comparison performed by the template matcher 1302. A threshold may be defined, such that a match probability of (for example) greater than 50% is determined to indicate a match. A high match score (e.g., as depicted) may be generated even when the copy guard mark 1602, as it appears on the scanned page 1604, has different visual attributes (orientation, color, size, etc.), as compared with the stored security pattern 1608. These parameters and their values are examples, and are not intended to limit the scope of the present disclosure.

In one embodiment, on condition that the copy guard mark on a page is determined to be a match with a registered security pattern, the scanning or printing of that page or document comprising the page may be halted. A warning may be displayed on the scanning/printing machine's user interface. A warning may in one embodiment be sent as an electronic message to a company's document security officer.

Figure 17:
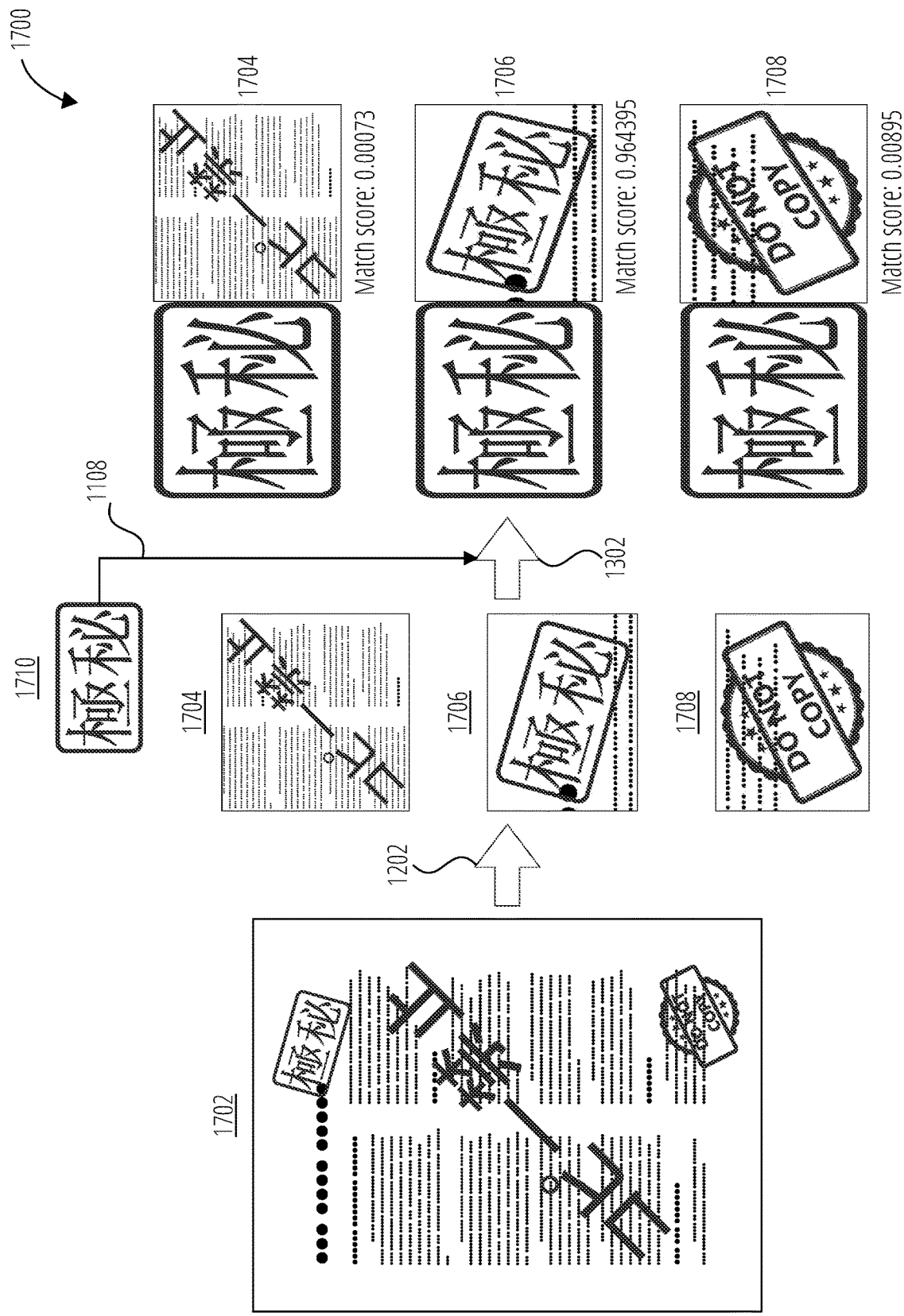
FIG. 17 depicts a two-stage flow of custom stamp or watermark detection 1700 in accordance with one embodiment.

FIG. 17 depicts two-stage flow of custom stamp or watermark detection 1700 in accordance with one embodiment, utilizing a pattern localizer 1202 to analyze a page 1702 and detect potential security stamps such as those shown. The pattern localizer 1202 may detect and isolate these areas as cropped regions, e.g., cropped region 1704, cropped region 1706, and cropped region 1708 in the depicted example.

A template matcher 1302 trained through one-shot learning 1108 may be applied to recognize registered security pattern 1710. In this example, comparing cropped region 1704 to the registered security pattern 1710 yields a match score of 0.00073. Comparing the registered security pattern 1710 to cropped region 1706 yields a match score of 0.964395. Comparing cropped region 1708 to the registered security pattern 1710 yields a match score of 0.00895.

In one example, comparisons yielding a match score of above 0.5 are configured to indicate a match between the feature detected on the page 1702 and the registered security pattern 1710.

The pattern localizer 1202 may be an artificial intelligence augmented library such as Detectron2, or a similar neural network trained in pattern recognition and image detection. In one embodiment, the pattern localizer 1202 may be the pair of identically weighted networks 1504 such as those described with respect to FIG. 15.

The template matcher 1302 may comprise a pair of identically weighted networks in one embodiment. In another embodiment, the template matcher 1302 may comprise a match head 1508 such as described with respect to FIG. 15.

Figure 18:
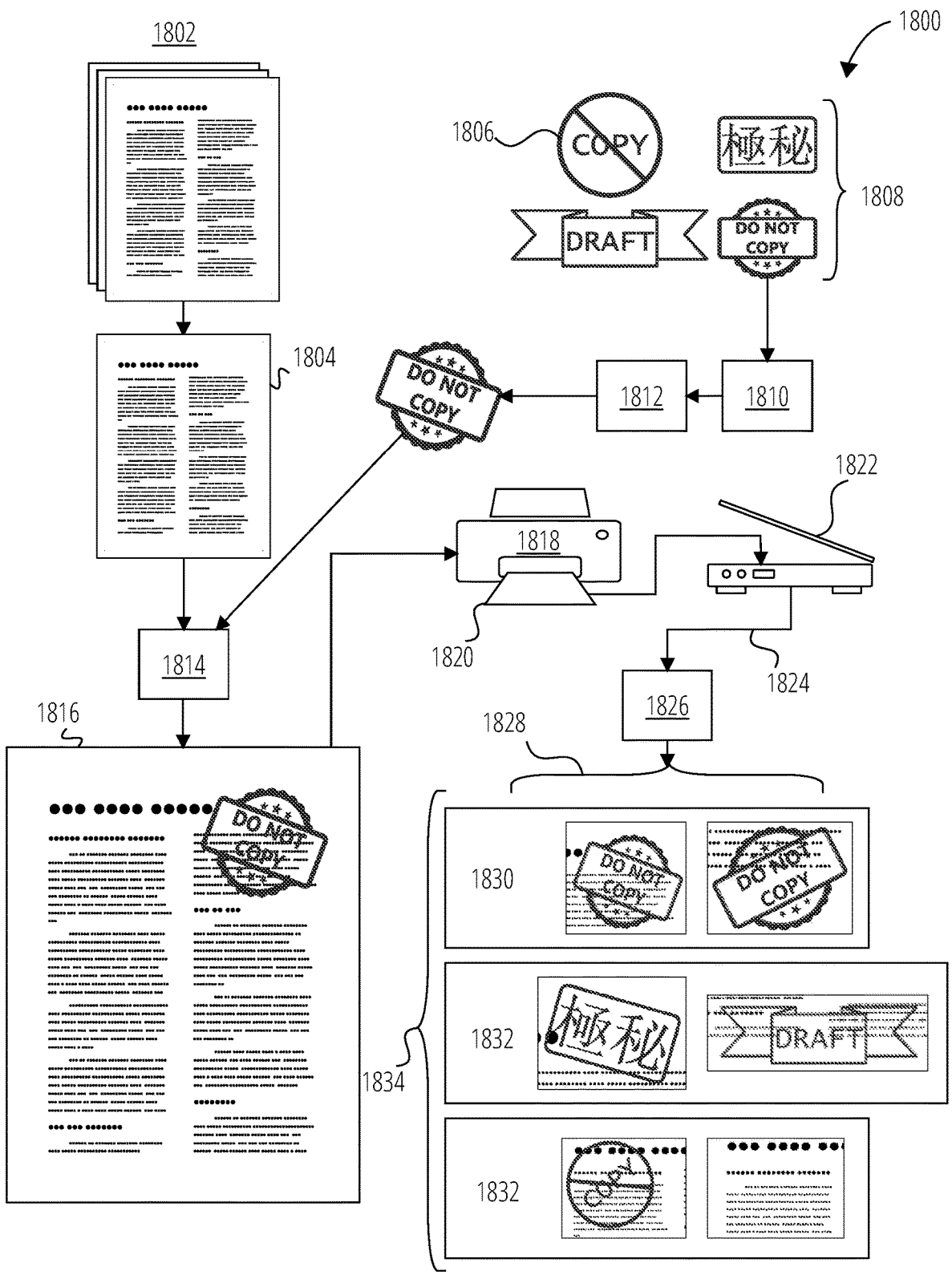
FIG. 18 depicts an aspect of the subject matter in accordance with one embodiment.

FIG. 18 depicts a training set development flow diagram 1800 in accordance with one embodiment. The training set development flow diagram 1800 is illustrative of a data flow carried out in the process 1900 described with respect to FIG. 19.

The training set development flow diagram 1800 comprises an office document pages 1802, a background image 1804, a pattern 1806, a collection of patterns 1808, an affine transformer 1810, a noise injector 1812, an alpha blender 1814, a synthesized stamped page 1816, a printer 1818, a printed page 1820, a scanning element of a photocopier 1822, a scanned page 1824, an image editor 1826, a cropped regions 1828, a first identifier 1830, a second identifier 1832, and a labeled pair of cropped regions 1834.

FIG. 19 depicts a process 1900 in accordance with one embodiment. The process 1900 may use elements depicted in the training set development flow diagram 1800 of FIG. 18. The process 1900 may begin with block 1902, with the formation of a collection of office document pages 1802, which may be set as background images 1804 in block 1904. These may come from the Internet, public files within a company, or other sources.

A collection of patterns 1808 may also be formed, for example, by web-scraping, web-crawling, or otherwise collecting copy guard stamp patterns and other stamp patterns. "Web" here may be understood to include, but not be limited to, collections limited to the scope of local area and enterprise-area networks.

For each pattern 1806 in the collection of patterns (block 1906) certain actions are iterated. At subroutine block 1908, an affine transformer 1810 randomly (more technically, pseudo-randomly) affine transforms the pattern 1806. Affine transformations may include transformations of scale, sheer, rotation, reflection, etc. At subroutine block 1910, a noise injector 1812 adds noise to the pattern. At subroutine block 1912, the transformed pattern, including noise, is overlaid onto a randomly selected one of the background images 1804, using an alpha blender 1814 performing masked alpha blending to generate a synthesized stamped page 1816.

At block 1914, a printer 1818 may be used to print the synthesized stamped page 1816 to generate a printed page 1820. At block 1916, the printed page 1820 may be scanned by a scanning element of a photocopier 1822 to generate a scanned page 1824. One of ordinary skill in the art may easily comprehend that devices other than a printer and photocopier which possess printing and scanning technology may be used to complete these steps as well. These steps may introduce print and copy noise, such as may be reasonably expected in stamped office documents created through conventional document use channels.

In block 1918, regions of the scanned pages where patterns have been overlaid may be cropped using an image editor 1826 to form cropped regions 1828. Exemplary image editors may include such editors as are typically provided as part of a computer operating system, or enhanced commercial editors such as Adobe Photoshop, or automated systems using open-source image editing libraries.

The images cropped in block 1918 may in block 1920 be grouped into pairs. These pairs may be labeled in block 1922 with a first identifier 1830 to identify pairs comprising a same pattern, or labeled in block 1924 with a second identifier 1832 identifying pairs comprising a different pattern. The latter may include pairs where one of the images in the pair contains no stamp image. In one embodiment, pairs having the same stamp pattern may be labeled with a "1" while pairs having different patterns may be labeled with a "0". The result of process 1900 may be a training set of labeled pair of cropped regions 1834 suitable to train a neural network using one-shot learning.

Figure 20:
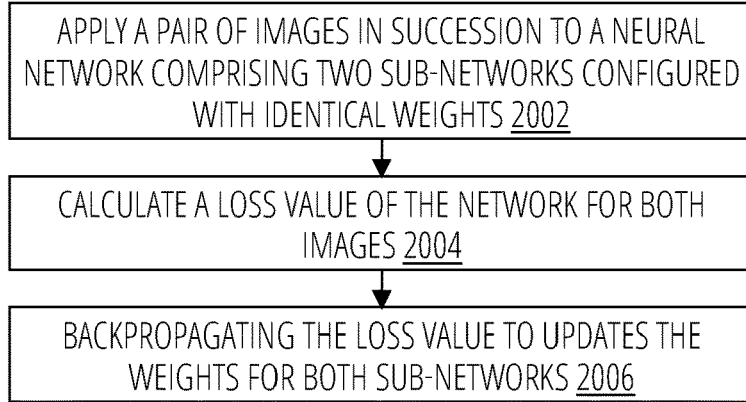
FIG. 20 depicts a process 2000 in accordance with one embodiment.

FIG. 20 depicts a process 2000 in accordance with one embodiment. The process 2000 may begin in block 2002 by applying a pair of images in succession to (e.g., only one sub-network of) a neural network comprising two sub-networks configured with identical weights. This neural network may in one embodiment be the pair of identically weighted networks 1504 such as depicted in FIG. 15.

In block 2004, a loss value of the network may by calculated for both images. In block 2006, the loss value may be backpropagated to update the weights for both sub-networks. In this manner the sub-networks may be refined for improved performance.

Figure 21:
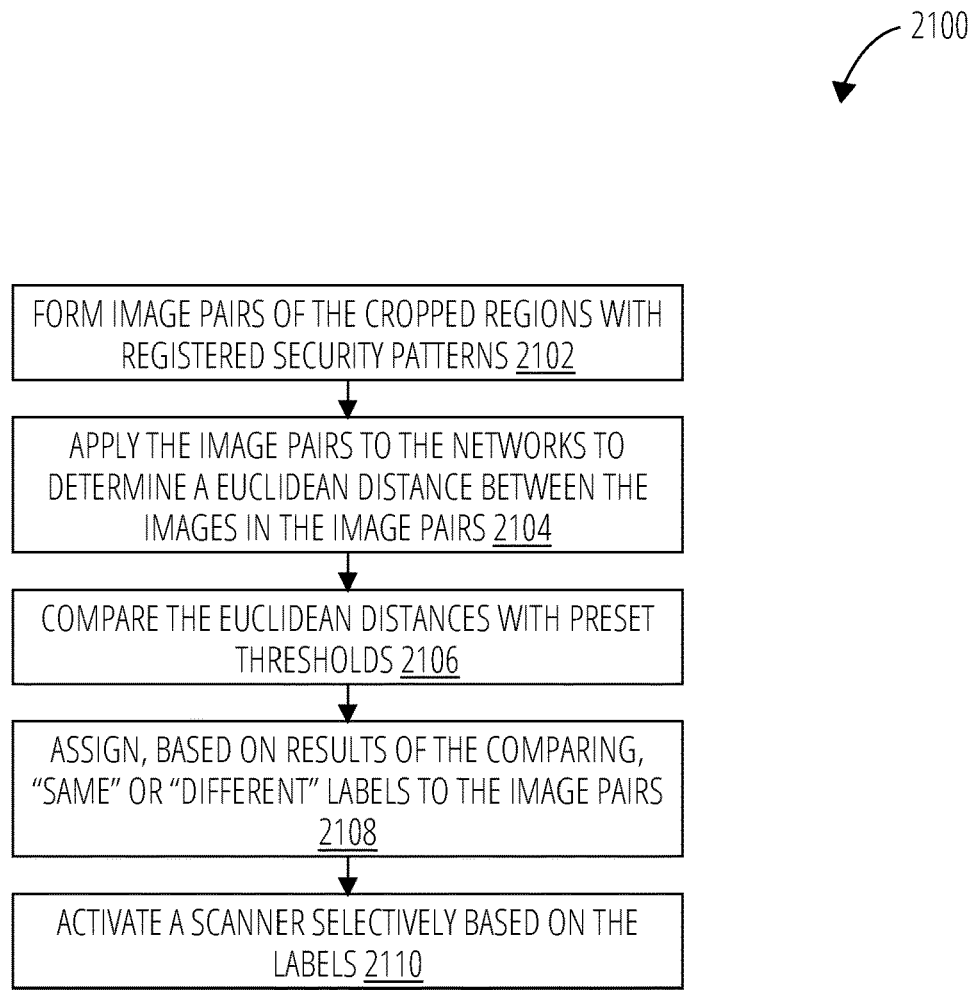
FIG. 21 depicts a scanner control process 2100 in accordance with one embodiment.

FIG. 21 depicts a scanner control process 2100 in accordance with one embodiment. In one embodiment, the scanner may be or include a scanning element in a photocopier. The scanner control process 2100 may begin in block 2102 by forming image pairs each comprising one of the cropped regions and one of the registered security patterns.

In block 2104, the image pairs may be applied to networks to determine a Euclidean distance between the images in the image pairs. These networks may in one embodiment comprise a pair of identically weighted networks such as the one depicted in FIG. 15. A comparator may be used in block 2106 to compare the Euclidean distances with preset thresholds.

In block 2108 the neural networks may assign a label to an image pair based on the results from the comparator. A "same" label (the actual label may be any binary-valued set of symbols or values) may be assigned when the comparator indicates a match between the images of the image pair, and a "different" label may be assigned where a match is not indicated by the comparator results.

At block 2110, the scanner may be selectively activated by the comparator based on the labels. In this manner, where a match between images of the image pair indicates that a copy guard stamp pattern is present in scanned material, the scanner may perform one set of actions, and where no match with a copy guard stamp pattern is indicated, the scanner may perform another, different set of actions.

For example, detection of a copy guard stamp pattern on a page of a scanning or printing job may result in the scanner ceasing operation the job. An alert may be sent in the form of an email to a company security officer. Absence of a copy guard stamp pattern may result in the scanner continuing its operation on a next page of the job.

Embodiments of algorithms are described for consolidating the bounding boxes generated by the RPN layer of a deep learning model. The algorithm may be utilized for example in a deep learning-based document security system that employs candidate localization and re-identification using one-shot twin neural network matching system.

In a first stage, instances of candidate security watermark objects are localized from a scanned document. In a second stage, a twin neural network matcher identifies the existence of a registered security watermark within the scanned document.

For the second stage to perform accurately, the correct instance may need to be localized in the first stage for matching in the second stage. Conventional systems may be prone to misdetection or partial detection of the candidate object, which may result in a failure of the matching in the second stage.

Figure 22:
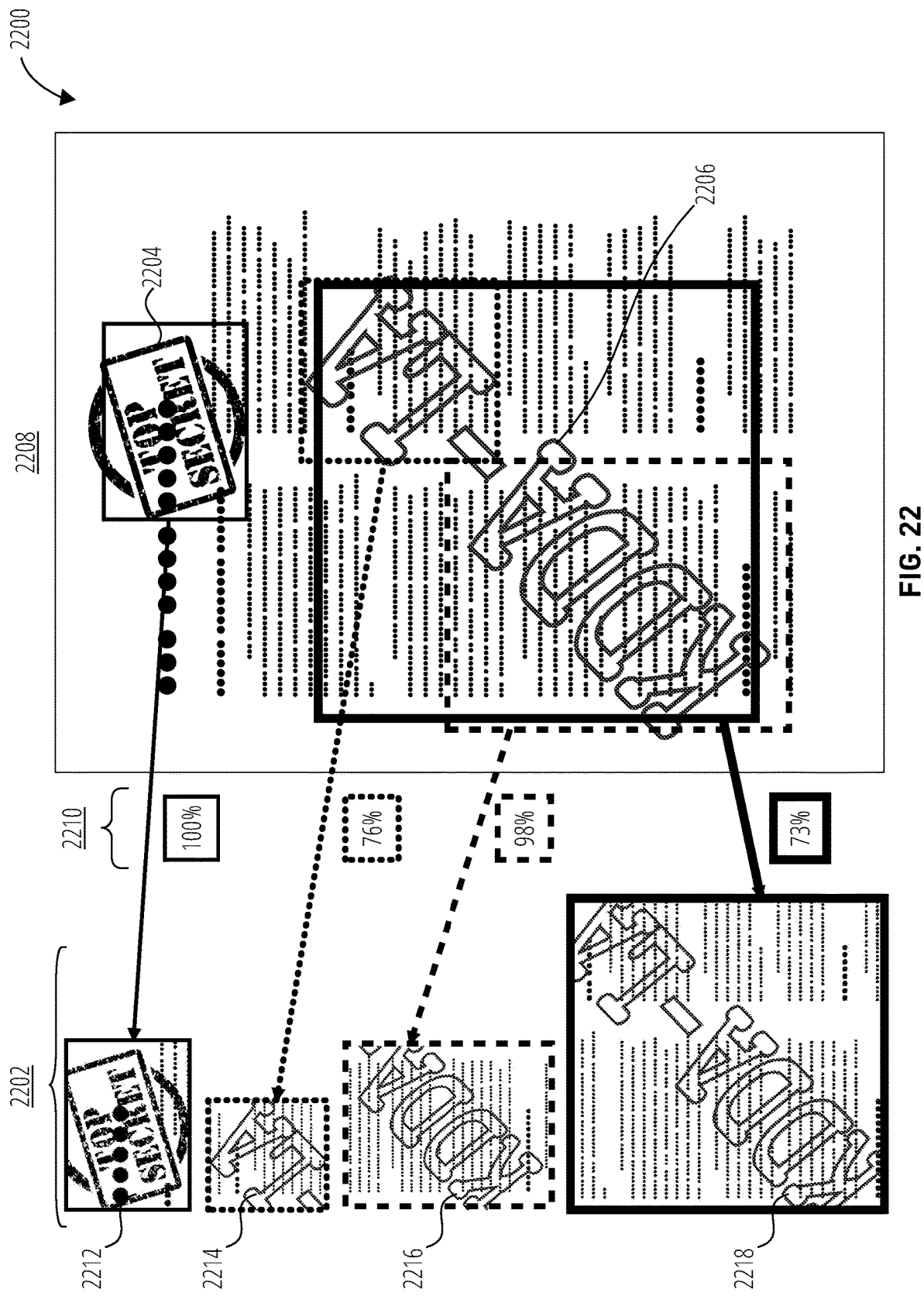
FIG. 22 depicts faster R-CNN object detector outputs 2200 in accordance with one embodiment.

FIG. 22 depicts faster R-CNN object detector outputs 2200 in one embodiment. A system may utilize a faster R-CNN based object detector whose RPN layer returns the bounding boxes 2202 for stamp objects 2204 or watermark objects 2206 from a scanned document 2208. In one embodiment, the R-CNN generates stamp or watermark probabilities 2210 indicating a confidence level that a stamp or watermark is detected in the bounding box 2202.

Due to the sparse nature of textual watermarks, a generic trained object detector as utilized in conventional systems may miss the complete watermark, or may detect multiple regions as different objects.

As depicted in FIG. 22, the Faster R-CNN object detector outputs bounding boxes 2202 for text objects identified in a scanned document. Stamp or watermark probabilities 2210 may also be generated by the Faster R-CNN for each of the bounding boxes 2202. The outputs may undergo pattern matching after detection.

To facilitate accurate pattern matching, one or more of the bounding boxes 2202 (e.g., for the TOP SECRET stamp object 2212 in this example) may be expanded to encompass more of, or the entirety of, a stamp or watermark. As may be seen in FIG. 22, the bounding box 2202 initially identified for the TOP SECRET stamp object 2212 may at first omit a portion of the stamp object. An expansion of the resultant bounding box 2202 may correct the cropping seen in this example. This is described in greater detail with respect to the algorithm for analyzing bounding boxes 2400 depicted in FIG. 24.

In addition, the KDD-LA watermark partial objects 2214 and 2216 may need to be consolidated for accurate pattern matching. The algorithm for dense bounding boxes over a tightly packed text object 2500 described with respect to FIG. 25 for the dense/crowded scenario may be applied to obviate the segmentation issue (e.g., of the KDDA-La watermark object 2218 into KDD-LA watermark partial object 2214 and KDD-LA watermark partial object 2216 as depicted in FIG. 22).

Figure 23:
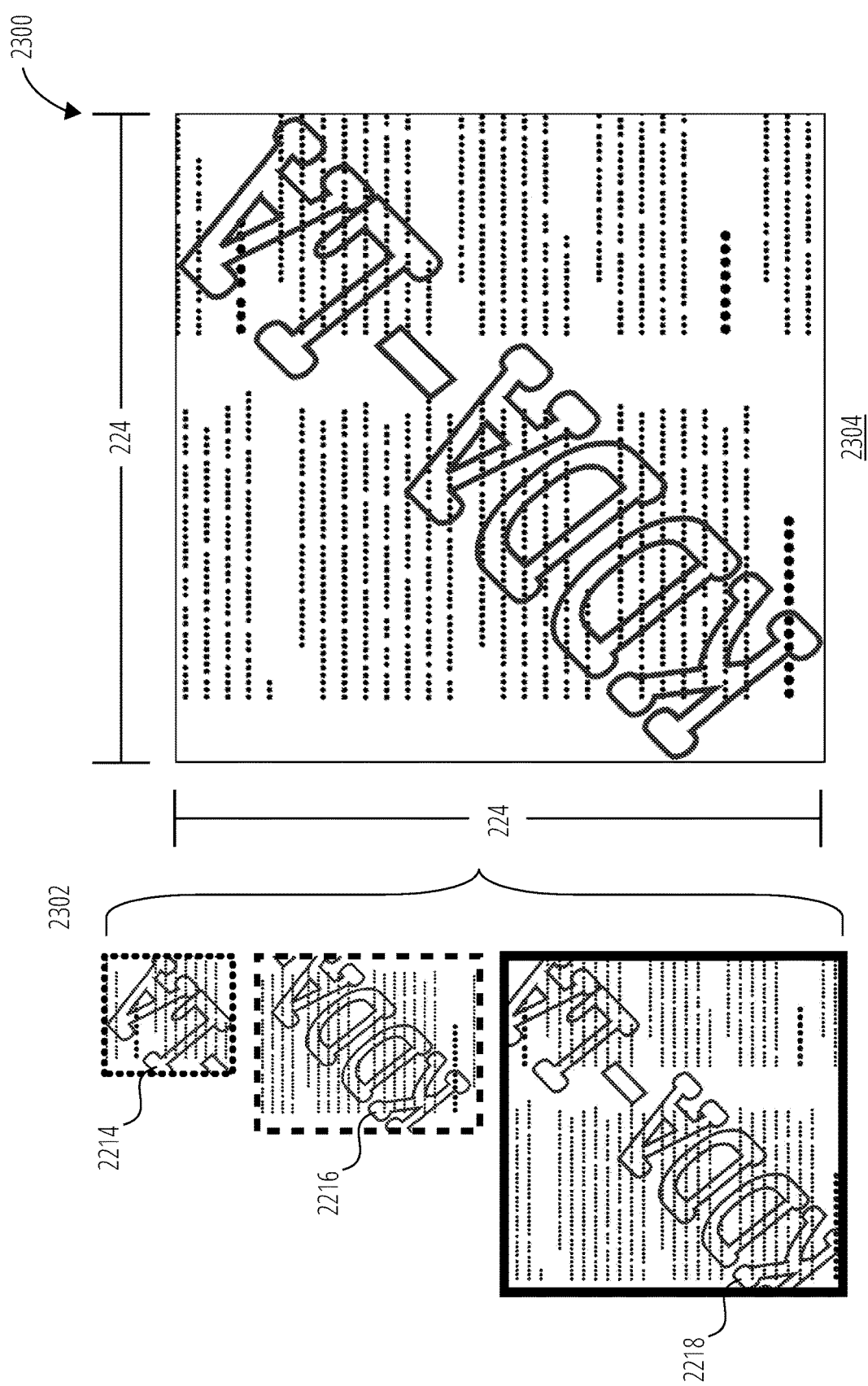
FIG. 23 depicts refinement algorithm results 2300 in accordance with one embodiment.

FIG. 23 depicts refinement algorithm results 2300 in accordance with one embodiment. The KDDA-La watermark object 2218, KDD-LA watermark partial object 2214, and KDD-LA watermark partial object 2216 from FIG. 22 may undergo refinement algorithms, such as those depicted in FIG. 24, FIG. 25, and FIG. 26. These algorithms may work to consolidate and resize 2302 the bounding boxes for KDDA-La watermark object 2218, KDD-LA watermark partial object 2214, and KDD-LA watermark partial object 2216, the result being full KDDA-LA watermark bounding box 2304 as shown.

The full KDDA-LA watermark bounding box 2304 may be suitable for accurate processing by the template matcher, the algorithms having been used to consolidate bounding boxes for KDD-LA watermark partial object 2214 and KDD-LA watermark partial object 2216 to determine a parent bounding box for the KDDA-La watermark object 2218, which may then be resized to correct cropping and arrive at the full KDDA-LA watermark bounding box 2304.

FIG. 24 depicts an algorithm for analyzing bounding boxes 2400 in accordance with one embodiment. Depending on the implementation, this algorithm may be carried out on bounding boxes identified by the RPN before they are processed by the ROI head, or on bounding boxes 2202 determined by the ROI head before data is sent to the twin neural network.

The algorithm for analyzing bounding boxes 2400 begins at block 2402 with a comparison between each bounding box identified by the RPN and every other RPN-identified bounding box. The algorithm for analyzing bounding boxes 2400 may be repeated iteratively for every bounding box identified.

Some bounding boxes may be arranged with dense (i.e., crowded) spacing over a tightly packed text object. Others may have sparse (i.e., distant) spacing over a widely spread out text object. Such bounding boxes may be identified at block 2404, and may need to undergo alteration using the algorithm for dense bounding boxes over a tightly packed text object 2500 or the algorithm for sparse bounding boxes over a widely spread out text object 2600 respectively.

At block 2406, cleaned up bounding boxes may be expanded by a preset expansion percentage where needed to avoid cropped edges. In one embodiment, an expansion percentage of 3% may be used. Other embodiments may use a larger or smaller expansion percentage, depending on the accuracy or efficiency desired in the detection algorithm. Expansion percentages may for example be expected to vary between 0% and 10%.

Once the expansion percentage is applied, in some embodiments the bounding boxes may need to be reevaluated with respect to each other, in order to perform additional alteration, or confirm such alteration is not necessary. The algorithm for analyzing bounding boxes 2400 therefore may return to block 2402 at this point. At block 2408, the final list of bounding boxes may be determined as encompassing different stamp or watermark objects.

FIG. 25 depicts an algorithm for dense bounding boxes over a tightly packed text object 2500 in accordance with one embodiment. A bounding box is expanded by a predetermined expansion percentage at block 2502. In one embodiment, the expansion percentage used may be 5%. Other embodiments may use a larger or smaller expansion percentage, depending on the accuracy or efficiency desired in the detection algorithm. Expansion percentages may for example be expected to vary between 0% and 15%.

At decision block 2504, it may be determined whether or not the bounding box is (post-expansion) fully contained within the area of a larger bounding box. If the smaller box is still present within the area of the larger box, the smaller bounding box may be merged into the larger bounding box (block 2506). This resulting bounding box may be identified as a parent bounding box.

If the smaller bounding box is determined not to be fully contained within the area of the larger bounding box, then at decision block 2508 it may be determined if at least a preconfigured percentage of the smaller box's area is present within (overlaps with) another bounding box. This preconfigured percentage may in some embodiments be 50%. This percentage may be varied across a range that is suitable for the application to which the algorithm is applied. For example, the percentage may be varied between 45% and 55% in some embodiments.

If at least the preconfigured percentage of the smaller bounding box's area is present within the area of another box, then at block 2510 a larger bounding box may be identified such that this new bounding box contains the convex area of the two overlapping bounding boxes. This new box may be identified as the parent bounding box, and the coordinate information of the two separate bounding boxes may be obviated in favor of the coordinate information of the parent.

Alternately, if less than the preconfigured percentage of the smaller box's area is present with the area of the other bounding box, then at block 2512 the two bounding boxes may be identified separately at this time. At a later stage of the iterative algorithmic process, a parent may yet be identified that contains one or both of these bounding boxes, at which time they may be merged accordingly.

FIG. 26 depicts an algorithm for sparse bounding boxes over a widely spread out text object 2600 in accordance with one embodiment. The algorithm begins at block 2602 with determining that the direction of a first bounding box is in coherence with the direction of a second bounding box at block 2602. In the context of this disclosure, "in coherence with" refers to being in angular alignment with, and in one specific embodiment, refers to diagonals of the two bounding boxes being in angular alignment.

At decision block 2604, it may be determined whether the coherence is within a predetermined percentage of the edge size within that direction. In one embodiment, the predetermined percentage may be 10%. In such a case, were the first box to be expanded by 10% in the direction of the second box, the two boxes may touch or overlap. This percentage may be varied across a range that is suitable for the application to which the algorithm is applied. For example, the percentage may be varied between 5% and 15% in some embodiments.

If coherence is determined at decision block 2604 to be within the predetermined percentage, the two bounding boxes may be joined at block 2606, due to the likelihood they collectively describe a continuous pattern, such as a textual object. Joining the boxes means forming a new parent bounding box comprising the area of both child boxes, as well as any area in an intervening space between them in the coherent direction.

If the coherence is determined not to be within the predetermined percentage at decision block 2604, the algorithm concludes by identifying the two boxes separately at block 2608. At a later stage of the iterative algorithmic process, a parent may yet be identified that contains one or both of these bounding boxes, at which time they may be joined accordingly.

Figure 27:
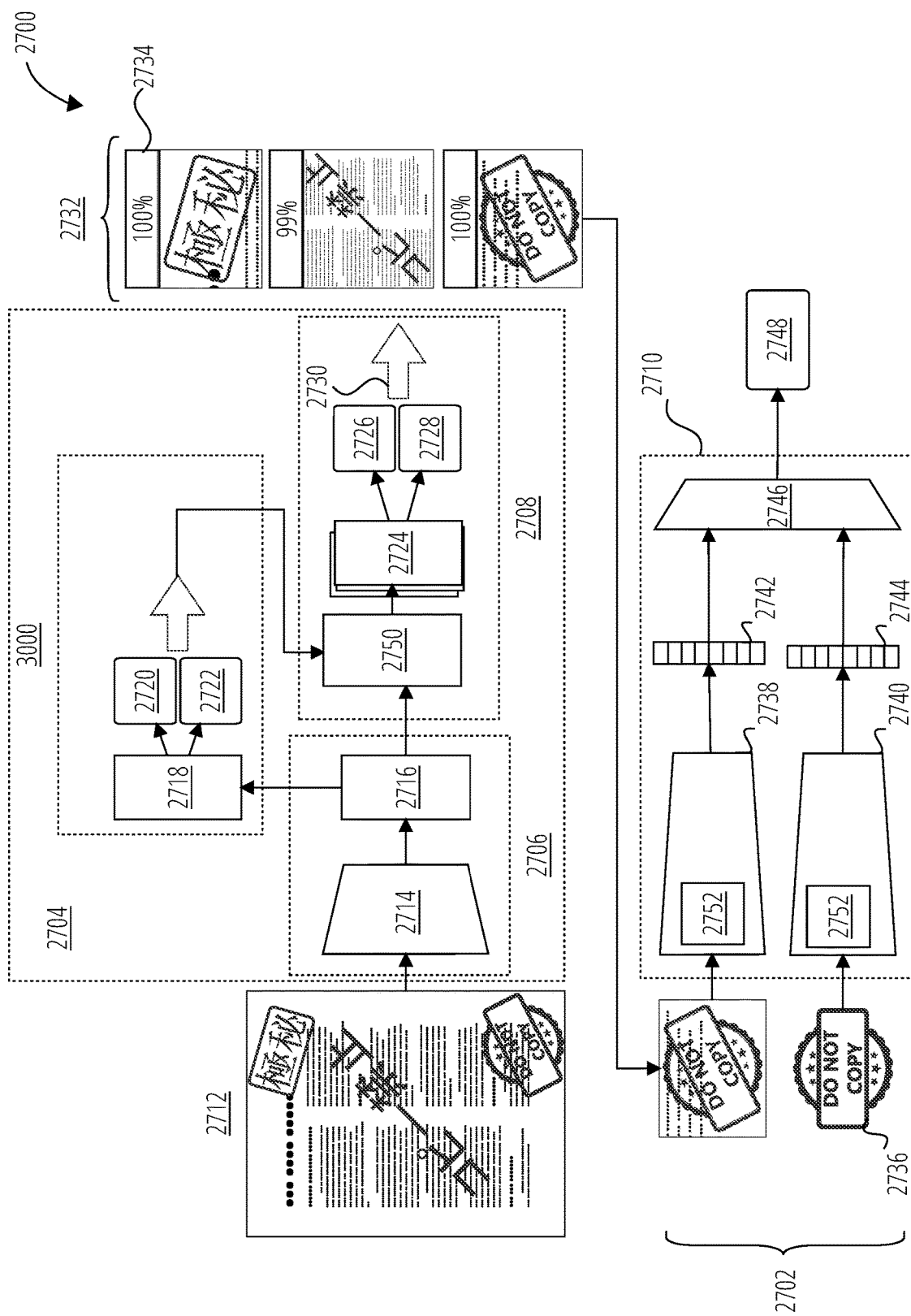
FIG. 27 depicts a digital image comparator 2700 in accordance with one embodiment.

FIG. 27 depicts a digital image comparator 2700 in accordance with one embodiment. The digital image comparator 2700 may be utilized by document processing devices such as a multifunction printer (MFP) or a photo scanner.

The digital image comparator 2700 comprises a first stage and a second stage 2702. The first stage comprises a high-performance region proposal convolutional neural network (R-CNN 2704) that includes encoders 2706, a region proposal network (RPN 3000), and a region of interest head (ROI head 2708). The second stage 2702 comprises a deep twin neural network 2710 and one or more classification layers 2746.

The first stage processes an input image 2712 into region proposals and objectness scores for candidate stamp locations in the input image 2712.

The encoders 2706 of the R-CNN 2704 may for example comprise a ResNet50 2714 network configured to generate a global feature map 2716 for the input image 2712, which may be a scanned document page. The RPN 3000 may be a (relative to the overall R-CNN 2704 structure) small neural network.

The RPN 3000 of the R-CNN 2704 may comprise one or more convolution layers 2718 that process the feature map 2716 to generate objectness scores 2720 and region proposals 2722 for stamps (particular patterns) the R-CNN 2704 has been trained to recognize. The region proposals 2722 comprise bounding boxes for the candidate stamp patterns in the input image 2712.

The ROI head 2708 pools the feature maps 2716 from the encoder 2706 based on the region proposals 2722 and objectness scores 2720 from the RPN 3000 to create local feature maps 2724. The ROI head 2708 generates objectness scores 2726 and refined region proposals 2728 (refined bounding boxes) for these local feature maps 2724. Post-processing, including in some cases non-maximal suppression, may be applied to filter/sort these refined region proposals 2728 by their objectness scores and to reduce/eliminate overlap among the refined region proposals 2728. Non-maximum suppression (NMS) is a common post-processing step in machine object detectors. NMS is applied to prune the number of overlapping detected candidate regionsof-interest (ROIs) and replace them with a single, more spatially accurate detection. NMS selects a single entity out of many overlapping entities (for example bounding boxes in object detection). One common criterion utilized by NMS algorithms is to discard candidates that are classified below a pre-set probability value.

The second stage 2702 of the digital image comparator 2700 comprises a deep twin neural network 2710 that generates metrics of an extent to which patterns comprised by two input images (regions of interest 2732 and registered stamp image 2736) are similar or not. The refined region proposals 2728 are utilized for focus attention of a first neural network 2738 of the deep twin neural networks 2710 on locations in the input image 2712 where likely stamp patterns are located. The second neural network 2740 of the deep twin neural network 2710 receives the registered stamp image 2736.

Each neural network 2738 and neural network 2740 may comprise an encoder 2752 (e.g., convolutional layers with identical weights). The encoder 2752 of neural network 2738 generates local feature maps 2742 for the regions of interest 2732 output from the R-CNN 2704, i.e., areas of the input image 2712 corresponding to refined region proposal 2728 with high objectness scores 2726. The encoder 2752 of neural network 2740 generates local feature maps 2744 for the registered stamp images 2736. As noted previously, the weights of the two encoder 2752 may be trained by processing image pairs sequentially through a single one of the neural networks 2738 to conserve computational resources.

Each neural network in the deep twin neural network 2710 may comprise other layers that are not depicted, but that would be understood by those of skill in the art to be present, such as pooling and flattening layers.

The local feature map 2742 and local feature map 2744 are applied to one or more classification layers 2746 (e.g., fully-connected layers) that generate a similarity score 2748. The similarity score 2748 is indicative of an extent to which patterns comprised by the two input images are similar or different. The similarity score 2748 for each input image pair may be stored and later ranked, filtered, or otherwise processed to control or provide feedback to a document scanning and/or duplication process. For example, if a high similarity score 2748 is determined between one of the regions of interest 2732 and a registered stamp image 2736 tagged or otherwise indicated as a security mark, scanning and/or duplication of the document or document page may be prevented, or a warning alert issued to the user of the scanner/duplication machine.

In the depicted embodiment, the second stage 2702 performs a one-to-one comparison between one of the identified regions of interest 2732 and a registered stamp image 2736 by operating (e.g., in parallel) the two twin networks of the deep twin neural network 2710. It may be readily understood by one of ordinary skill in the art that multiple regions of interest 2732 may be identified and may be iteratively compared to the registered stamp image 2736.

Likewise, multiple registered stamp images 2736 may be stored and may be iteratively compared to the regions of interest 2732. In this manner, multiple regions of interest 2732 and registered stamp images 2736 may be checked by a device equipped with embodiments of the disclosed detecting mechanism. Similarly, embodiments of the disclosed detecting mechanisms may be configured to perform one-to-n or n-to-one comparisons through the utilization of parallel models.

Figure 28:
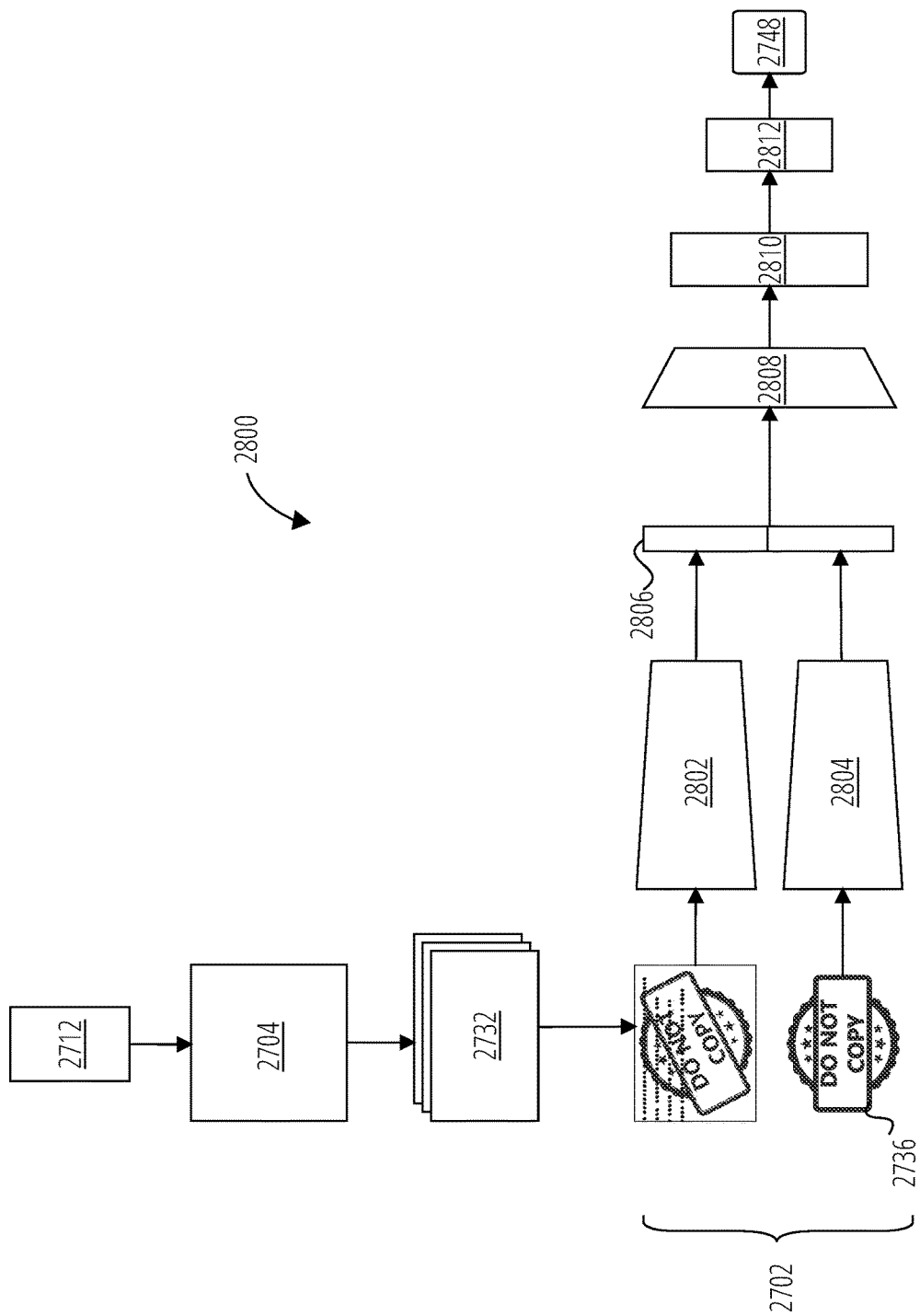
FIG. 28 depicts a digital image comparator 2800 in accordance with one embodiment.

FIG. 28 depicts a digital image comparator 2800 in accordance with one embodiment, wherein the neural networks of the deep twin neural network 2710 comprise ResNet34 networks 2802, 2804.

The local feature maps generated in the deep twin neural network 2710 may be flattened and joined into a concatenated local feature vector 2806 that is processed through a pooling layer 2808, a fully connected layer 2810, and a fully connected layer 2812 to generate the similarity score 2748 between pairs of the regions of interest 2732 and registered stamp images 2736.

The digital image comparator 2700 and digital image comparator 2800 may be computationally inefficient in some aspects, in particular due to the regeneration of local feature maps in the second stage 2702. For example, if a user registered five stamps, and the detector identified five possible candidates, then twenty-five serial feature re-extractions (permutations of five stamps with five candidates) are performed in the deep twin neural network 2710.

Figure 29:
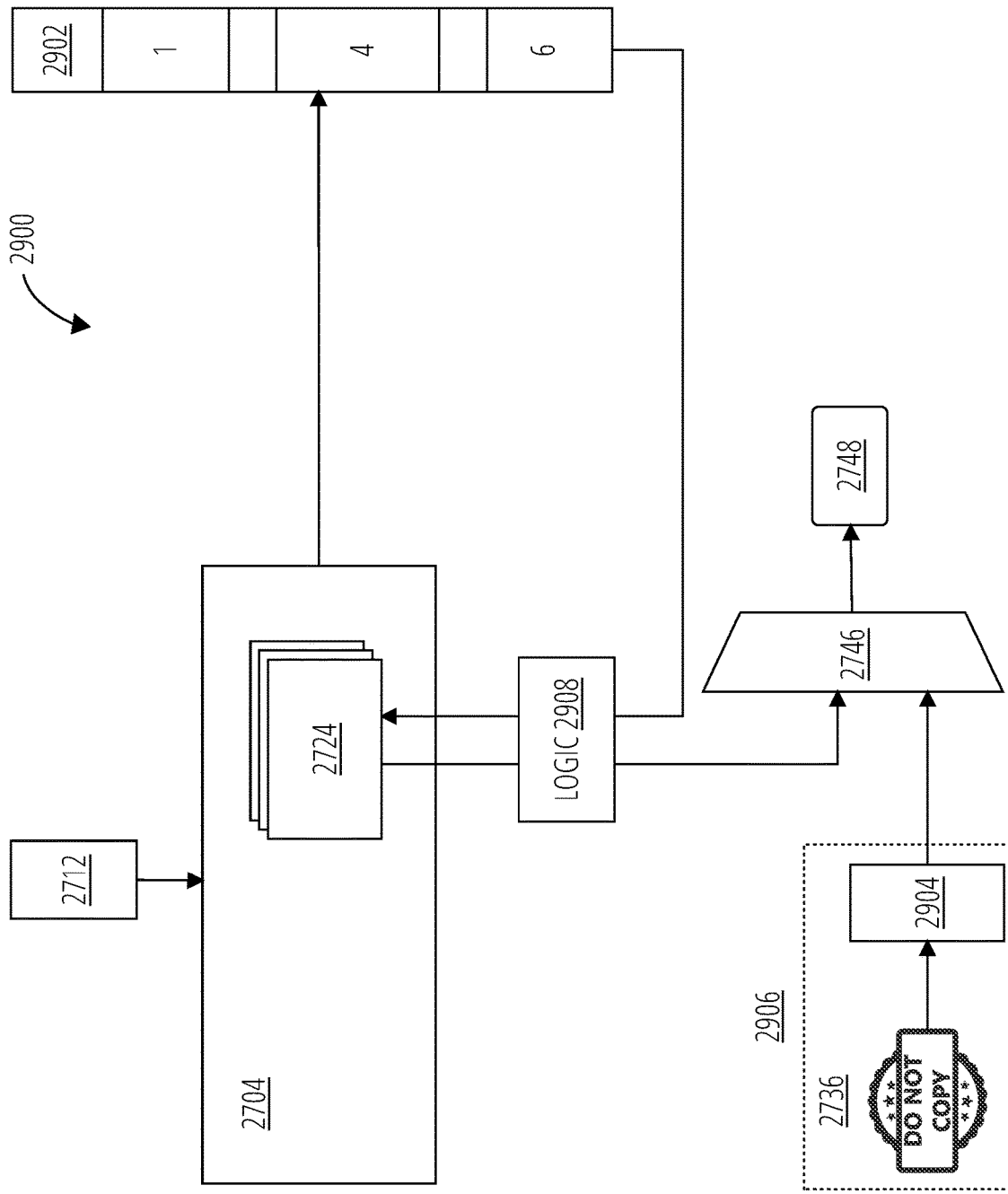
FIG. 29 depicts a digital image comparator 2900 in accordance with one embodiment.

In one embodiment, the structure of the R-CNN 2704 in the first stage is modified so that the encoder(s) may be eliminated from the match head in the second stage 2702. FIG. 29 depicts a digital image comparator 2900 in accordance with such an embodiment. The digital image comparator 2900 comprises features in common with previously described embodiments, including the encoder 2706, RPN 3000, and a ROI head 2708 that cooperate to generate the local feature maps 2724 for the input image 2712. However, the digital image comparator 2900 comprises additional logic to preserve the local feature maps 2724 in an indexed data structure (e.g., a matrix, table, or other database structure), to make the local feature maps 2724 retrievable for use in the second stage 2702 via local feature map indexes 2902.

In one embodiment, the local feature maps are stored in a multi-dimensional matrix (l×m×n), where the n dimension comprises indexes that may be utilized to reference and retrieve the corresponding local feature maps.

Instead of utilizing a filtered set of regions of interest 2732 to focus the attention of the encoders in the deep twin neural networks 2710 on specific areas of the input image 2712 where stamps are likely depicted, the second stage 2702 utilizes a filtered (e.g., for objectiveness scores above a threshold) set of local feature map indexes 2902 to look up and retrieve the pre-generated (via a registration/configuration process 2906) local feature maps 2724 for the areas of the input image 2712 to focus on.

A document security system utilizing the digital image comparator 2900 may utilize logic 2908 to look up and retrieve each of the filtered local feature maps 2724 and pair each one with the feature map 2904 of a registered stamp image 2736, iterating through p×q unique pairings, where p is the number of local feature maps 2724 in the filtered set, and q is the number of registered stamp images 2736. These pairs may be processed through the match head classification layers 2746 to generate similarity scores 2748 for each pair. The logic 2908 may apply the similarity scores 2748 to influence a document duplication process.

Utilizing this mechanism, the probable stamp locations in the input image 2712 may be compared with the pre-generated and stored feature maps 2904 for registered stamp images 2736 without engaging an encoder in the twin neural network.

Figure 30:
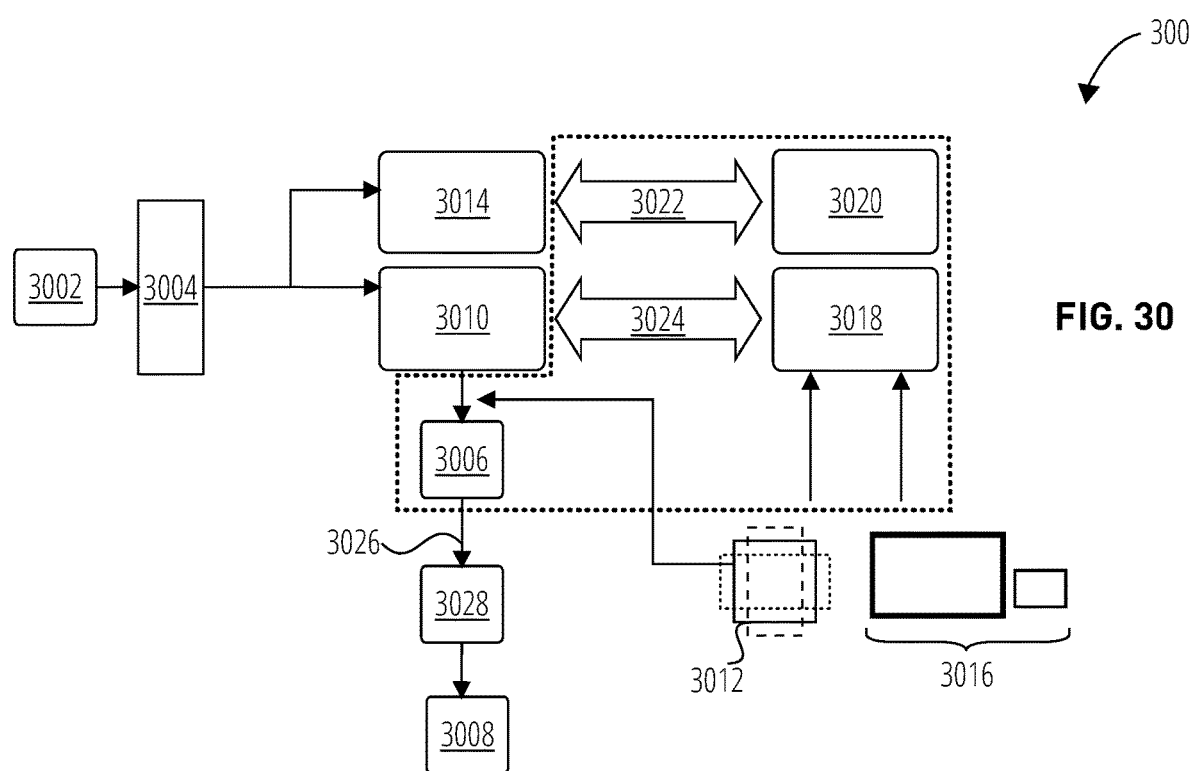
FIG. 30 depicts a region proposal network or RPN 3000 in accordance with one embodiment.

FIG. 30 depicts an RPN 3000 in accordance with one embodiment. Image feature maps 3002 are processed through one or more convolution layers 3004 to generate box proposals 3006 for use by a subsequent network, e.g., ROI head 3008. In addition to the one or more convolution layer 3004, the RPN 3000 may comprise various other layers, such as pooling and fully-connected layers, that are utilized to identify regions of interest in the image feature maps 3002 and scores for the likelihood that those regions of interest include an object that a subsequent classification network is trained to detect.

The box proposals 3006 may be generated as parameterized boxes based on anchor deltas 3010; in other words, the box proposals 3006 may be specified as differences (e.g., offsets or extents) relative to anchor boxes 3012. The RPN 3000 may generate the anchor boxes 3012 using a number of approaches, for example by sliding a fixed-size window over the image feature maps 3002. With this approach the center of the anchor box is determined by the sliding window, and the anchor box may be, but typically is not, of a same size and aspect ratio as the sliding window. For each of the anchor boxes 3012, the convolution layers 3004 generate multiple box proposals 3006, each of a different size and aspect ratio.

The RPN 3000 also generates an objectness score 3014 for each of the box proposals 3006. The objectness scores 3014 may be generated by one or more layers (e.g., SoftMax layers) that are not depicted in FIG. 30 but should be understood to be part of the RPN 3000.

The objectness score 3014 for a particular one of the box proposals 3006 is a prediction of the confidence that the particular box proposal includes an object or not (the actual classification of any object depicted in a particular box proposal is carried out by a subsequent classification network).

The network layers that generate the anchor deltas 3010 and objectness scores 3014 may be trained using ground truth boxes 3016 known (e.g., labelled) to comprise objects (or not to comprise objects). During training, the network may input image feature maps 3002 for training images and generate ground truth anchor deltas 3018 and ground truth objectness scores 3020. In one embodiment, binary cross-entropy loss 3022 and L1 loss 3024 may be applied to adjust the weights and/or activation levels of the RPN 3000 to effectuate training (see FIG. 33A and FIG. 33B).

The RPN 3000 utilizes a proposal selection function 3026 to cull (filter, reduce) the set of generated box proposals 3006 into a set of output box proposals 3028 to the subsequent classification network. The proposal selection function 3026 may select only those box proposals 3006 satisfying a threshold condition of objectness for the final output box proposals 3028. For example, only those box proposals 3006 having an associated objectness score 3014 meeting or exceeding a configured threshold value may be included in the output box proposals 3028.

In this manner, the RPN 3000 effectively operates as an attention mechanism for the subsequent classification network, indicating where in an image the classification network should focus on finding objects to classify.

Figure 31:
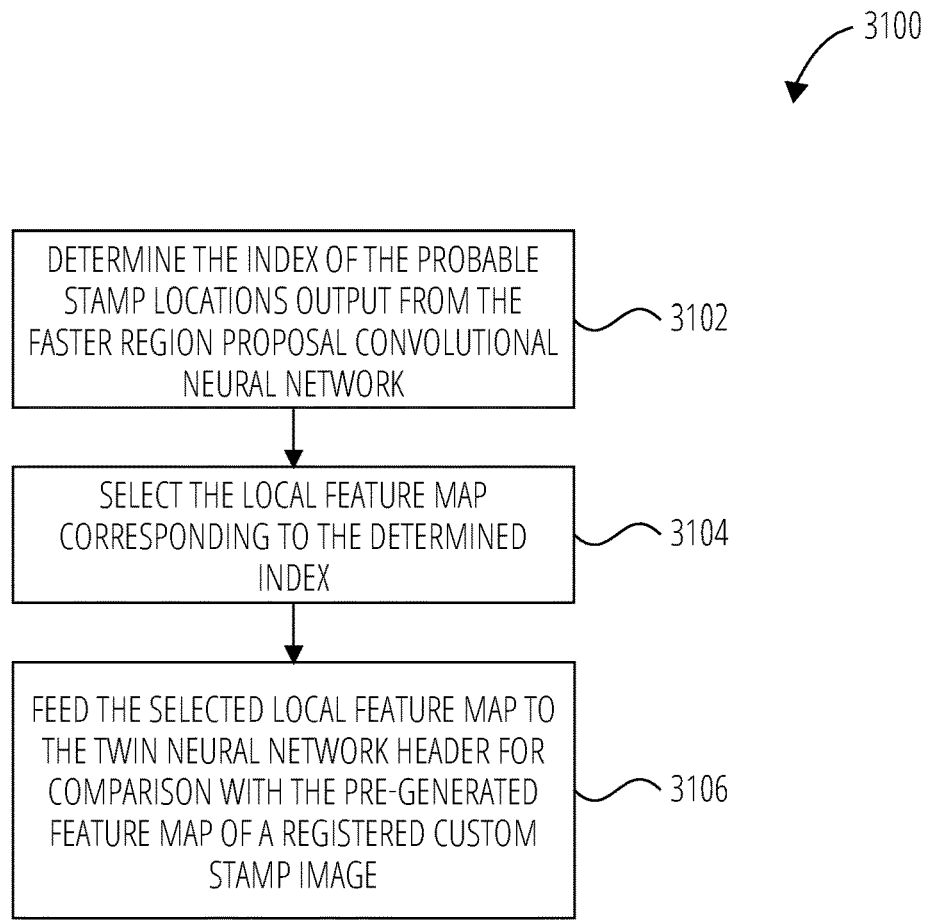
FIG. 31 depicts a one-stage detecting mechanism process 3100 in accordance with one embodiment.

FIG. 31 depicts a one-stage detecting mechanism process 3100 in accordance with one embodiment. This process may be implemented by a configuration such as the digital image comparator 2900 depicted in FIG. 29. At block 3102, the R-CNN 2704 may determine the local feature map index 2902 (and objectness score) of each of its regions of interest 2732.

Local feature maps corresponding to the local feature map indexes corresponding to the highest objectness scores may be selected at block 3104 and applied in pairs with feature maps pre-generated for registered stamp images during a registration/configuration process, thereby generating similarity scores that may be utilized to control a document duplication machine or process.

Figure 32A:
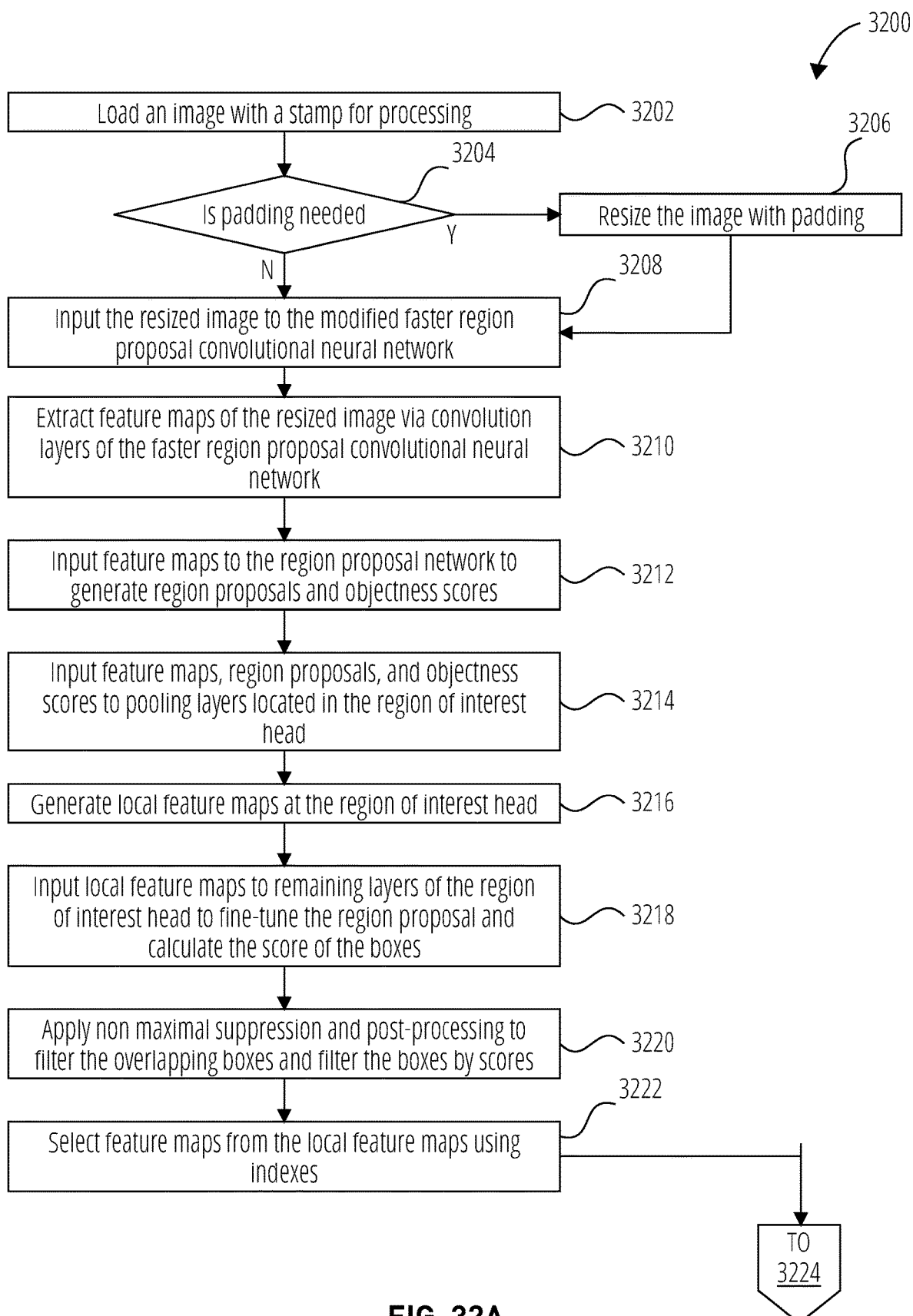
FIG. 32A and FIG. 32B illustrate an image processing process 3200 in accordance with one embodiment.
Figure 32B:
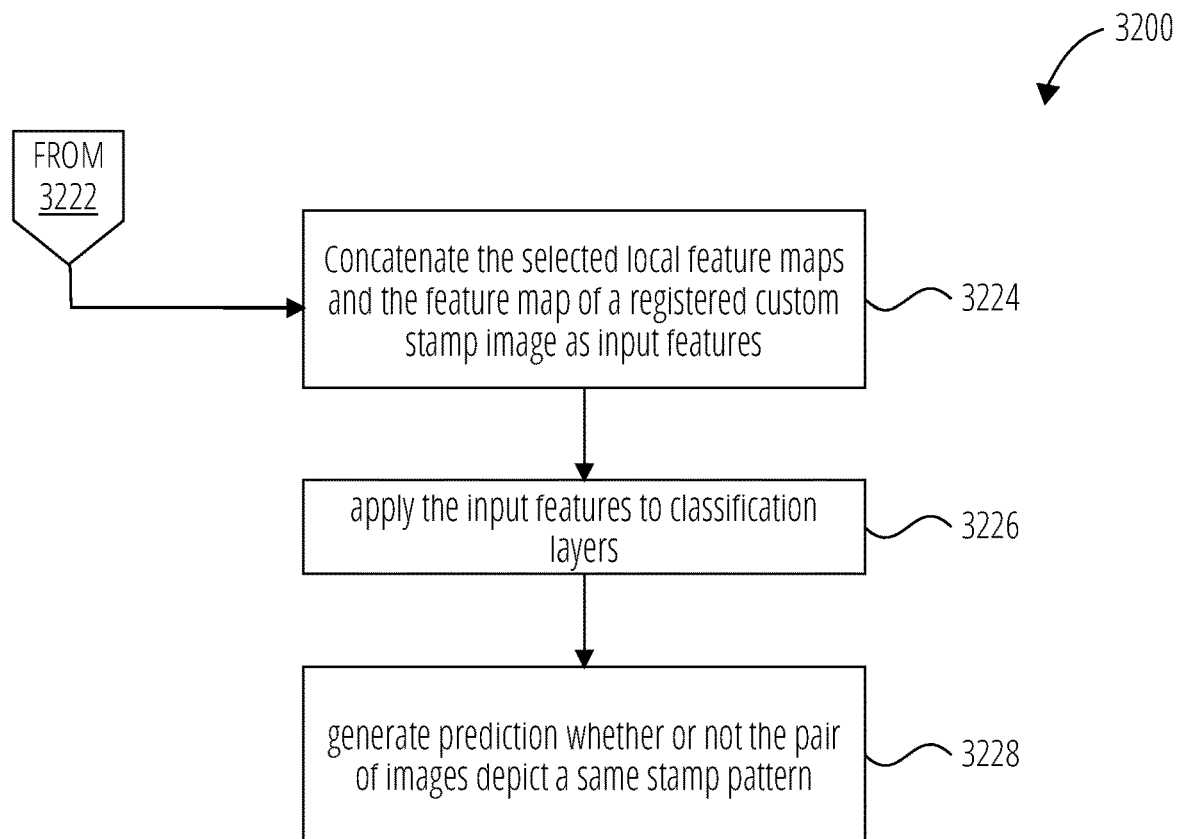

FIG. 32A and FIG. 32B depict an image processing process 3200 in one embodiment. At block 3202, an image comprising (one or more) stamp pattern may be loaded into machine memory for processing. This image may for example be generated by a scanning element operating on a printed sheet of paper. If padding is needed (decision block 3204) in order that the image be of an appropriate size for processing, the image may be resized with padding at block 3206. For example, if a 440×560 pixel image is to be analyzed with respect to a 680×680 pixel expected image size, 240 and 220 pixels may be added as padding in the respective image dimensions.

The image (padded or otherwise) may be input to a modified faster R-CNN at block 3208. Feature maps of the image may be extracted though convolutions layers of the faster R-CNN at block 3210. The feature maps extracted at block 3210 may be input to a region proposal network at block 3212 to generate the region proposals and objectness scores. The feature maps, the region proposals, and the objectness scores may then by region of interest pooling layers at block 3214 to generate local feature maps for the regions of interest at block 3216.

The local feature maps are processed through additional logic at block 3218 to finetune the region proposals and objectness scores (and possibly make corresponding modifications to the local feature maps, e.g., cropping or expanding to account for changes to the region proposals). Post-processing are applied at block 3220 to filter out extraneous overlapping region proposals (such redundancy being a common artifact of region proposal networks) and to filter/rank the region proposals (and thus the local feature maps) by objectness scores. The local feature maps (post processing) are stored in an indexed data structure, and indices of the resulting candidate regions of highest objectness are exported from the R-CNN for selection (block 3222) and classification/matching with registered stamps.

The image from either block 3202 or block 3206 may be input to the modified faster R-CNN at block 3208. Feature maps of the image may be extracted though convolutions layers of the faster R-CNN at block 3210. These convolution layers may comprise ResNet50 2714 neural networks as depicted in FIG. 27.

The feature maps extracted at block 3210 may be input to the RPN at block 3212 to generate the region proposals and objectness scores. The feature maps, the region proposals, and the objectness scores may then all be input to the ROI Pooling layers located in the ROI Head at block 3214 to generate the local feature maps at block 3216.

The local feature maps are input to the remaining layers of the ROI Head at block 3218 to finetune the region proposal and calculate the score of the boxes. Non-Maximal Suppression (NMS) and post-processing are applied at block 3220 to filter the overlapping boxes and filter the boxes by scores. With the given indices, the feature maps may be selected at block 3222 from the local feature maps generated at block 3216.

At block 3224, the selected local feature maps from block 3222 and previously determined and stored feature maps of registered stamps may be concatenated as input features to one or more fully-connected classification layer (block 3226). The classification layers are operated at block 3228 to predict whether or not this pair of images comprise the same stamp.

Figure 33A:
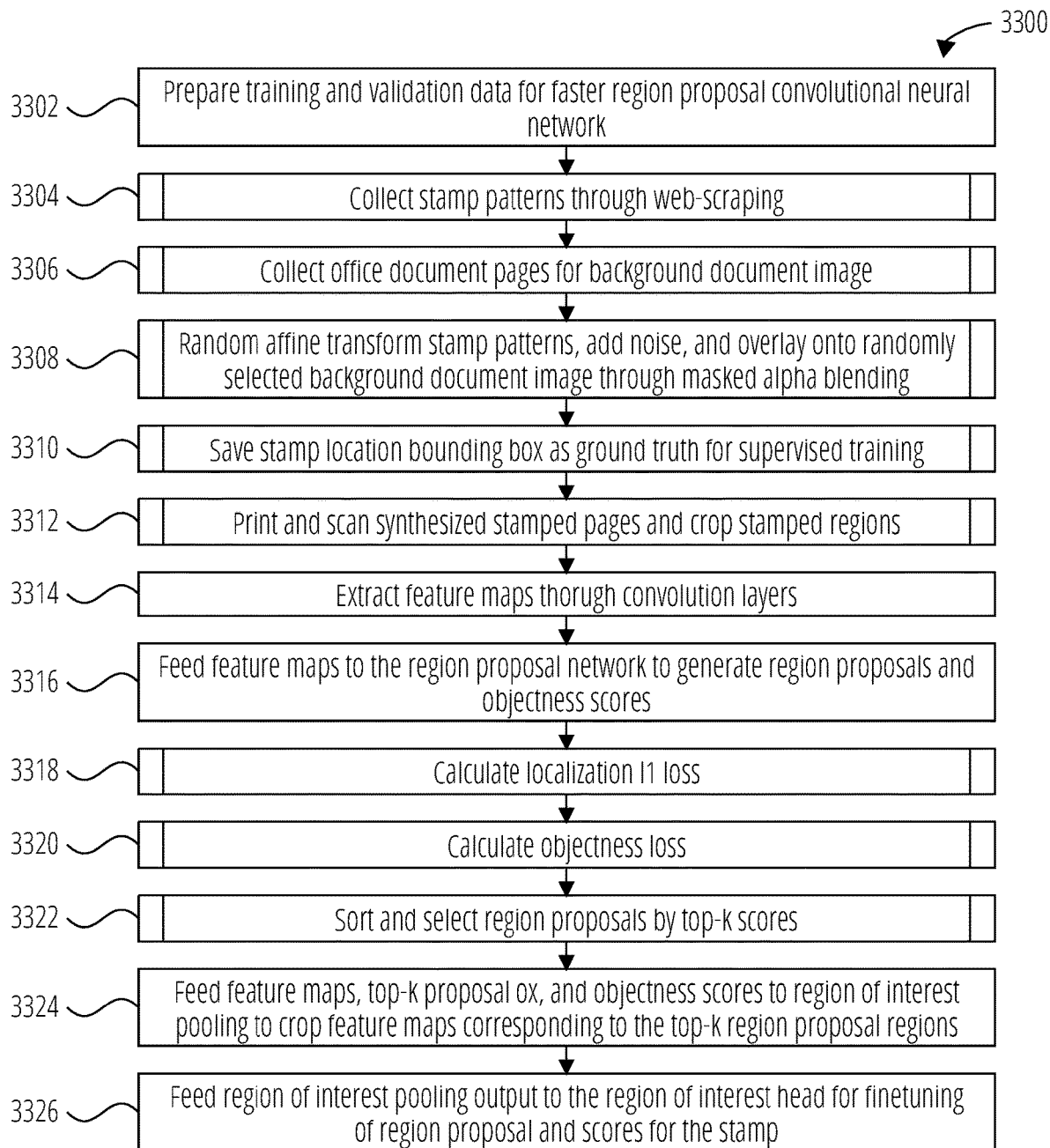
FIG. 33A and FIG. 33B illustrate a network training and validation process 3300 in accordance with one embodiment.
Figure 33B:
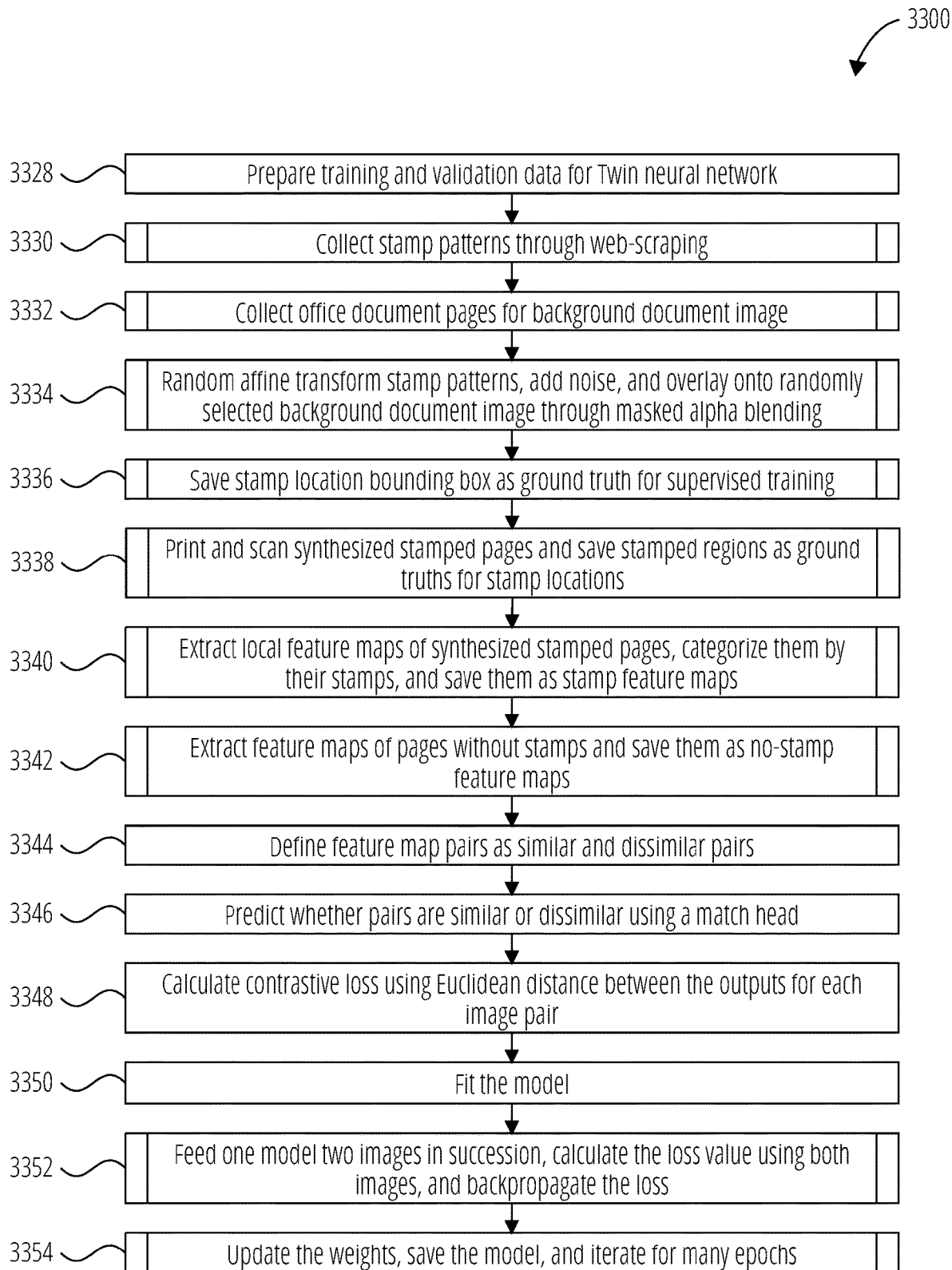

FIG. 33A and FIG. 33B illustrate a network training and validation process 3300 in accordance with one embodiment. The process begins with preparing training and validation data at block 3302. At subroutine block 3304 web-scraping (data harvesting) is carried out for stamp patterns from Internet sources, or other publicly or privately available stamp repositories. Office document pages may be similarly collected at subroutine block 3306 to serve as background images for synthesized training document input images.

At subroutine block 3308, stamp patterns collected in subroutine block 3304 may be randomly affine transformed. Noise may be added to the transformed patterns, and the resulting image may be overlaid onto a randomly (technically, pseudo-randomly) selected background image from those collected in subroutine block 3306, for example by using masked alpha blending.

Stamp locations (bounding boxes) may be saved at subroutine block 3310 as ground truth for the supervised training. The stamp locations (bounding boxes) may be saved as JavaScript Object Notation (JSON) files for the label of the image in one embodiment.

The synthesized stamped pages may be printed and scanned at subroutine block 3312. This introduces print and copy noise such as may be encountered in an image of a physical document presented to a multifunction printer or scanner in the real world. The stamped regions may then be cropped from the scans at subroutine block 3312.

At block 3314 the feature maps may be extracted through convolution layers such as a ResNet50 neural network. These feature maps may be fed to the RPN at block 3316 to generate region proposals and objectness scores.

Localization loss (i.e., l1 loss) for backpropagation to modify the region proposal determination weights in the RPN may be calculated at subroutine block 3318. L1 loss is determined through a summation of the absolute value differences between all predicted values and the corresponding true values detected. This l1 loss may be expressed by the following equation.

$$l1\ loss = \sum_{i=1}^{n} |y_{true} + y_{predicted}|$$

At subroutine block 3320, binary cross-entropy loss for backpropagation to modify the objectness determination weights in the RPN may be calculated. Binary cross-entropy loss may be expressed by the equation below.

$$H_p(q) = -\frac{1}{N}\sum_{n=1}^{N} y_i \cdot \log(p(y_i)) + (1 - y_i) \cdot \log(1 - p(y_i))$$

where N is the number of objects under consideration, y is a label under consideration and p(y) is a predicted probability of y being the actual label value for all N elements under consideration.

At subroutine block 3322, the feature maps may be sorted and selected using their top-k scores. Top-k accuracy scores may be a computation of the number of times where the correct label is among the top k labels predicted (ranked by predicted scores).

Each of the proposals generated by the RPN is associated with a probability score. The k proposals with the highest probability scores are selected as RPN outputs. The corresponding regions of the feature maps are cropped by the ROI pooling algorithm(s).

The feature maps, top-k region proposals, and scores may be input to ROI pooling at block 3324 to generate the local feature maps corresponding to the top-k region proposal regions. The ROI pooling output may then be processed for finetuning of the region proposals and the objectness scores at block 3326.

FIG. 33B depicts an embodiment of a training and validation process for an image comparison and scoring neural network. The process begins with preparing data at block 3328. At subroutine block 3330 web-scraping of stamp patterns from Internet sources, or other publicly or privately available stamp repositories, may be carried out. Office document pages may be similarly collected at subroutine block 3332 to serve as background images for synthesized training document input images.

At subroutine block 3334, collected stamp patterns may be randomly affine transformed. Noise may be added to the transformed pattern, and the resulting image may be overlaid (e.g., using alpha blending) onto a randomly selected background image from those collected in subroutine block 3332.

Stamp locations (bounding boxes) may be identified by a human operator at subroutine block 3336 as ground truth for the supervised training. The stamp locations (bounding boxes) may be saved as JSON files for the label of the image in one embodiment.

The synthesized stamped pages may be printed and scanned at subroutine block 3338. This introduces print and copy noise such as may be encountered in an image of a physical document presented to a multifunction printer or scanner in the real world. The stamped regions may then be processed into pre-generated feature maps for the registered stamps.

Local feature maps of synthesized stamped pages may be extracted at subroutine block 3340 through the method described previously, categorized by the stamps, and saved as stamp feature maps. Feature maps may also be extracted for pages without stamps at subroutine block 3342. These may be saved as "no-stamp" feature maps. No-stamp case may include cases where 1) non-security stamps are present and 2) no stamp is present and the image is a randomly cropped portion of a background image.

At block 3344 feature maps may be grouped into pairs, and these pairs may be defined as similar pairs or dissimilar pairs. Similar pairs concatenate two local feature maps within the same stamp. Dissimilar pairs concatenate two local feature maps from two different stamps or a local feature map from any stamp and a no-stamp feature map.

At block 3346, a match head, e.g., the classification and other layers previously described to follow the R-CNN, may be operated to predict whether or not a given pair is a similar pair or a dissimilar pair. The match head may comprise a concatenation layer, a flatten layer, and two fully connected layers, for example.

At block 3348, contrastive loss may be calculated using the Euclidean distance between the outputs for each image pair. Contrastive loss is a loss function that uses distance-based loss as opposed to more conventional error-prediction losses. This loss is used to learn embeddings in which two similar points have a low Euclidean distance and two dissimilar points have a large Euclidean distance. In one embodiment the contrastive loss function described in conjunction with FIG. 9 may be utilized.

At block 3350, the model is fit. Because the weights are constrained to be identical for both networks of the twin network under training, one model within the network may be supplied two images in succession at subroutine block 3352. After that, the loss value using both the images may be calculated and then backpropagated. This both reduces memory usage and improves computational efficiency. At subroutine block 3354 the model weights may be updated, the model saved, and the process iterated for many epochs. Once final weights have been determined, identical weights may be used for both networks within the twin neural network.

The trained and validated models developed through implementing the network training and validation process 3300 may be deployed to a target device for use. The trained models may be mapped to layers supported by the target. Target devices may include photo scanner or multi-function printer devices.

---

Listing 1

---

If bounding boxes exist, then . . .
   Compare center of each bounding box, with all other bounding box areas
     If center of a given bounding box lie inside the other, then
        Record the minimum X, and Y of top left corner
        Record the maximum X, and Y of bottom right corner
        Update both fields with the recorded values
     Otherwise
       If the given bounding box lie inside 5% area padding of other, then
         Record the minimum X, and Y of top left corner
         Record the maximum X, and Y of bottom right corner
         Update both fields with the recorded values
       Otherwise
         Consider them unrelated

---

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A digital image comparator comprising:
an Faster R-CNN configured to generate a filtered set of local feature maps of an input image;
a match head; and
logic to:
preserve the local feature maps in an indexed data structure and to make the local feature maps retrievable by the match head via local feature map indexes;
pair the local feature maps with the feature map of a registered stamp image; and
iterate through p×q unique pairs of the local feature maps and feature maps of registered stamp images, where p is a number of local feature maps, and q is a number of registered stamp images, and to process the unique pairs through the match head to generate a similarity score for each unique pair.

2. The digital image comparator of claim 1, the match head configured to generate similarity scores without engaging an image feature map encoder.

3. The digital image comparator of claim 1, the logic further configured to apply the similarity score to influence a document duplication process.

4. A digital image comparison process comprising:
operating a Faster R-CNN on an input image to generate a filtered set of local feature maps of an input image;
preserving the local feature maps in an indexed data structure;
retrieving the local feature maps via local feature map indexes and applying the local feature maps to a match head, wherein the match head performs classification on a concatenation of one of the local feature maps and a second feature map for a second image, wherein the second feature map comprises a feature map for a registered stamp image; and
iterating through p×q unique pairs of the local feature maps and feature maps of registered stamp images, where p is a number of the local feature maps, and q is a number of registered stamp images, and processing the unique pairs through the match head to generate a similarity score for each unique pair.

5. The process of claim 4, the match head generating the similarity scores without engaging an image feature map encoder.

6. The process of claim 4, further comprising:
applying the similarity score to influence a document duplication process.

* * * * *